US012730223B2

(12) United States Patent
Kato

(10) Patent No.: US 12,730,223 B2
(45) Date of Patent: Sep. 8, 2026

(54) ESTIMATION APPARATUS, ESTIMATION SYSTEM, ESTIMATION METHOD, AND NON-TRANSITORY STORAGE MEDIUM

(71) Applicants: PIONEER CORPORATION, Tokyo (JP); PIONEER SMART SENSING INNOVATIONS CORPORATION, Tokyo (JP)

(72) Inventor: Masahiro Kato, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 64 days.

(21) Appl. No.: 18/845,364

(22) PCT Filed: Mar. 8, 2023

(86) PCT No.: PCT/JP2023/008799

§ 371 (c)(1),
(2) Date: Sep. 9, 2024

(87) PCT Pub. No.: WO2023/176621

PCT Pub. Date: Sep. 21, 2023

(65) Prior Publication Data

US 2025/0189673 A1 Jun. 12, 2025

(30) Foreign Application Priority Data

Mar. 14, 2022 (JP) ................................ 2022-038992

(51) Int. Cl.
*G01S 17/89* (2020.01)

(52) U.S. Cl.
CPC .................................. *G01S 17/89* (2013.01)

(58) Field of Classification Search
CPC ...... G01S 17/89; G01C 21/005; G09B 29/007
See application file for complete search history.

(56) References Cited

U.S. PATENT DOCUMENTS 11,635,304 B2 4/2023 Kato et al.
12,033,400 B2 7/2024 Tagawa et al.
(Continued)

FOREIGN PATENT DOCUMENTS

JP 2012-118666 A 6/2012
JP 2022-016908 A 1/2022
(Continued)

OTHER PUBLICATIONS

International Search Report received in PCT/JP2023/008799, dated Apr. 25, 2023, in 4 pages (with translation).

*Primary Examiner* — Tan Q Nguyen
(74) *Attorney, Agent, or Firm* — Procopio, Cory, Hargreaves & Savitch LLP

(57) ABSTRACT

The first acquisition unit (110) acquires point cloud data at a plurality of timings obtained by a sensor mounted on a moving body. A second acquisition unit (130) acquires map information. The division unit (150) divides each point cloud data item acquired by the first acquisition unit (110) into a plurality of predetermined regions. The ratio value calculation unit (170) calculates, for a first region and a second region different from the first region, a ratio value indicating an association ratio between each data point and the map information in each region. The estimation unit (190) identifies an estimated change point where a content of the map information is estimated to be different from an actual situation, using a strength of a correlation between a ratio value of the first region shifted in time or position and a ratio value of the second region.

19 Claims, 29 Drawing Sheets

(56) References Cited

U.S. PATENT DOCUMENTS

| | | | | |
|---|---|---|---|---|
| 2020/0249050 | A1 | 8/2020 | Kato et al. | |
| 2022/0012509 | A1 | 1/2022 | Tagawa et al. | |
| 2022/0254165 | A1 | 8/2022 | Yokota | |
| 2022/0413150 | A1 | 12/2022 | Kato | |
| 2023/0136235 | A1 * | 5/2023 | Wang | G06V 20/64 701/23 |
| 2023/0244244 | A1 * | 8/2023 | Hanyuda | G06T 19/00 701/25 |
| 2023/0294711 | A1 * | 9/2023 | Iida | G08G 1/165 701/70 |
| 2023/0311947 | A1 * | 10/2023 | Chong | G06V 20/58 701/26 |

FOREIGN PATENT DOCUMENTS

| | | | |
|---|---|---|---|
| JP | 2022-022287 | A | 2/2022 |
| WO | 2018-180338 | A1 | 10/2018 |
| WO | 2021-084896 | A1 | 5/2021 |
| WO | 2021-112177 | A1 | 6/2021 |

* cited by examiner

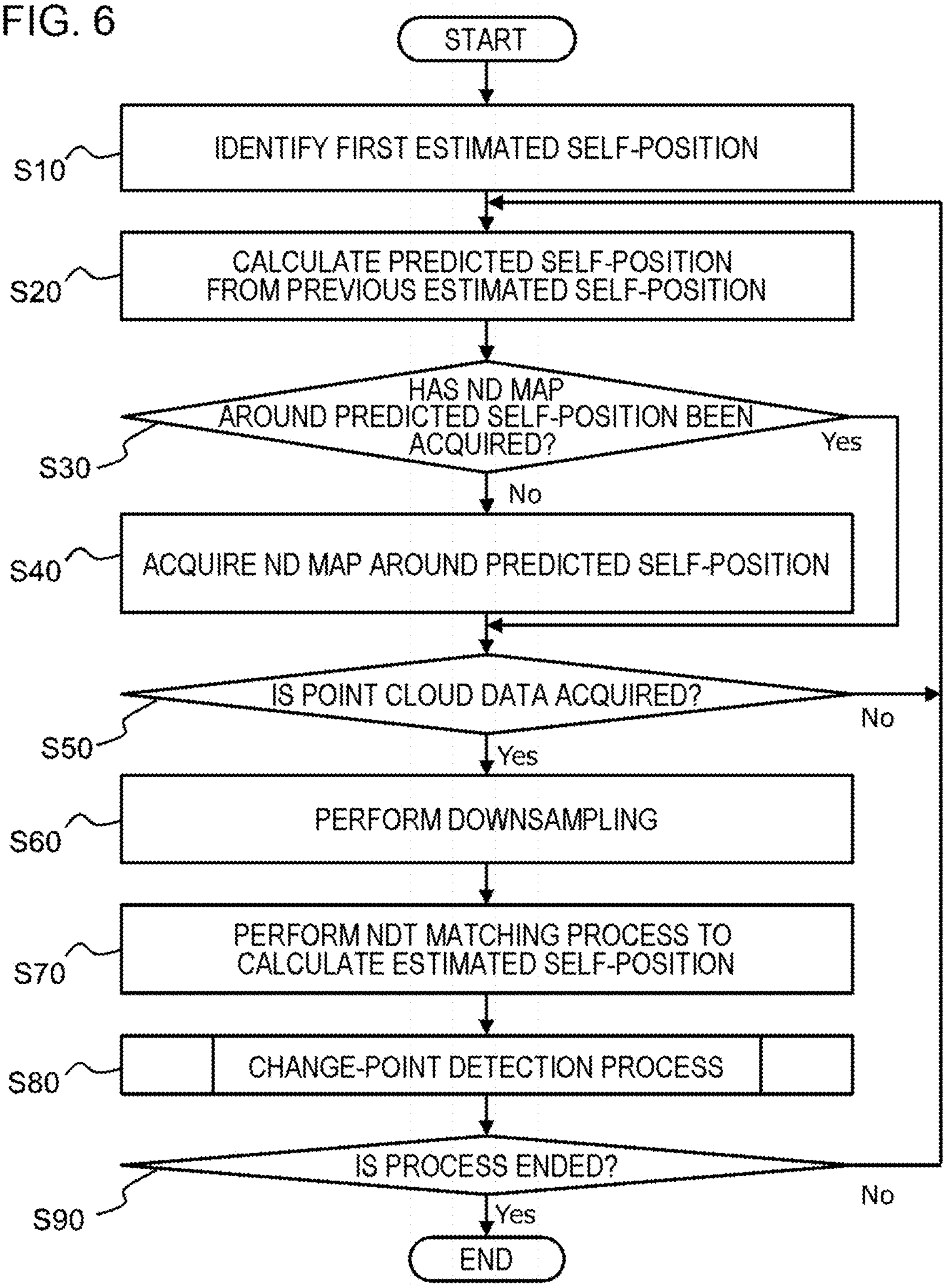

FIG. 6
START
S10
IDENTIFY FIRST ESTIMATED SELF-POSITION
S20
CALCULATE PREDICTED SELF-POSITION FROM PREVIOUS ESTIMATED SELF-POSITION
S30
HAS ND MAP AROUND PREDICTED SELF-POSITION BEEN ACQUIRED?
Yes
No
S40
ACQUIRE ND MAP AROUND PREDICTED SELF-POSITION
S50
IS POINT CLOUD DATA ACQUIRED?
No
Yes
S60
PERFORM DOWNSAMPLING
S70
PERFORM NDT MATCHING PROCESS TO CALCULATE ESTIMATED SELF-POSITION
S80
CHANGE-POINT DETECTION PROCESS
S90
IS PROCESS ENDED?
No
Yes
END

DAR
1.0
0
DDAR(5)
1.0
0
DDAR(6)
1.0
0
DDAR(7)
1.0
0
DDAR(8)
1.0
0
Time [s]
NORMALIZATION
DDAR(5)
1.0
0
DDAR(6)
1.0
0
DDAR(7)
1.0
0
DDAR(8)
1.0
0
Time [s]

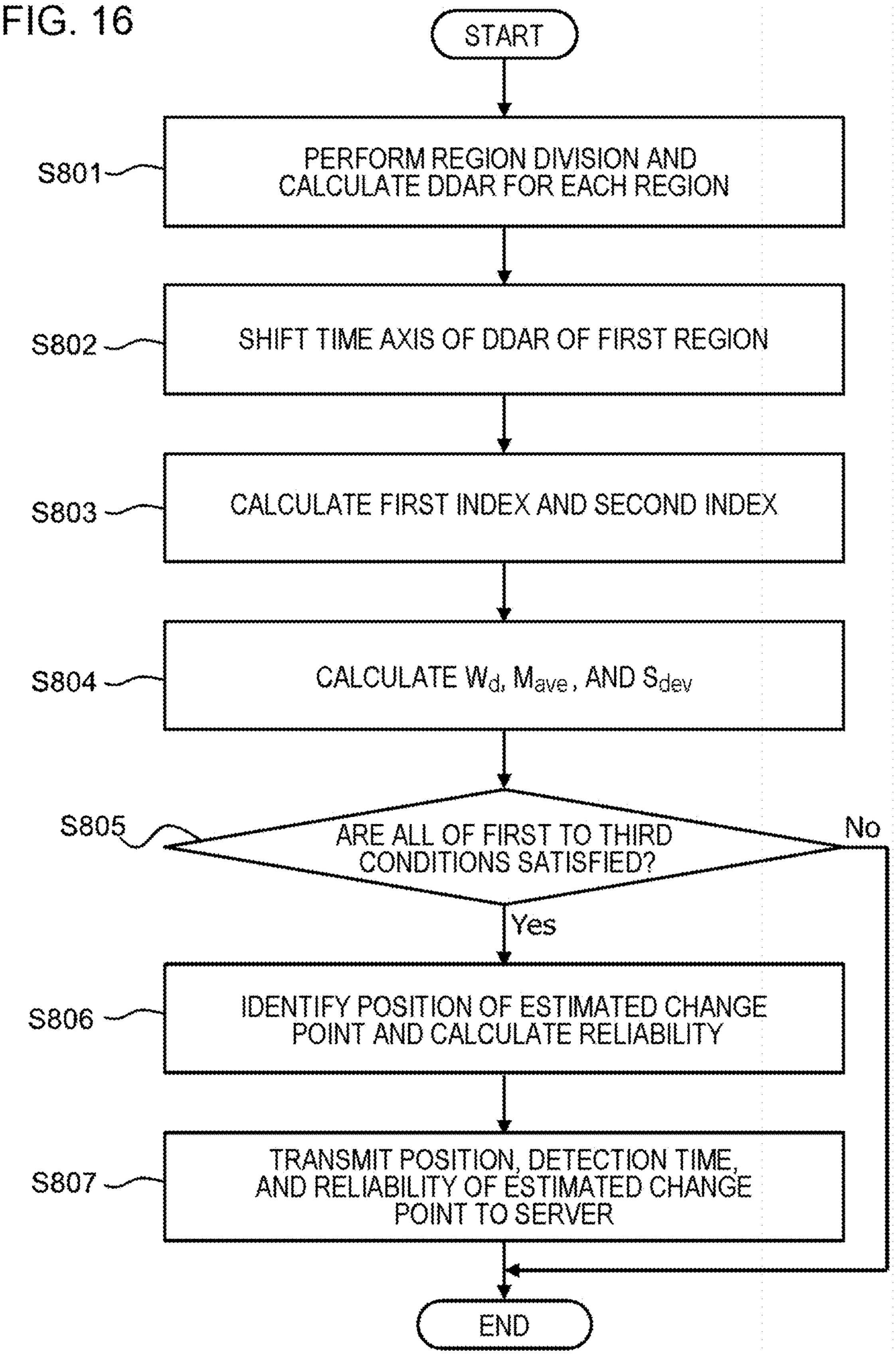

FIG. 16
START
S801
PERFORM REGION DIVISION AND CALCULATE DDAR FOR EACH REGION
S802
SHIFT TIME AXIS OF DDAR OF FIRST REGION
S803
CALCULATE FIRST INDEX AND SECOND INDEX
S804
CALCULATE $W_d$, $M_{ave}$, AND $S_{dev}$
S805
ARE ALL OF FIRST TO THIRD CONDITIONS SATISFIED?
No
Yes
S806
IDENTIFY POSITION OF ESTIMATED CHANGE POINT AND CALCULATE RELIABILITY
S807
TRANSMIT POSITION, DETECTION TIME, AND RELIABILITY OF ESTIMATED CHANGE POINT TO SERVER
END

40

CHANGE POINT INFORMATION ACQUISITION UNIT
410

INFORMATION DEVELOPMENT UNIT
420

EVALUATION UNIT
430

CHANGE POINT EXTRACTION UNIT
440

MAINTENANCE-REQUIRED POINT REGISTRATION UNIT
450

FLAG GIVING UNIT
460

STORAGE UNIT
470

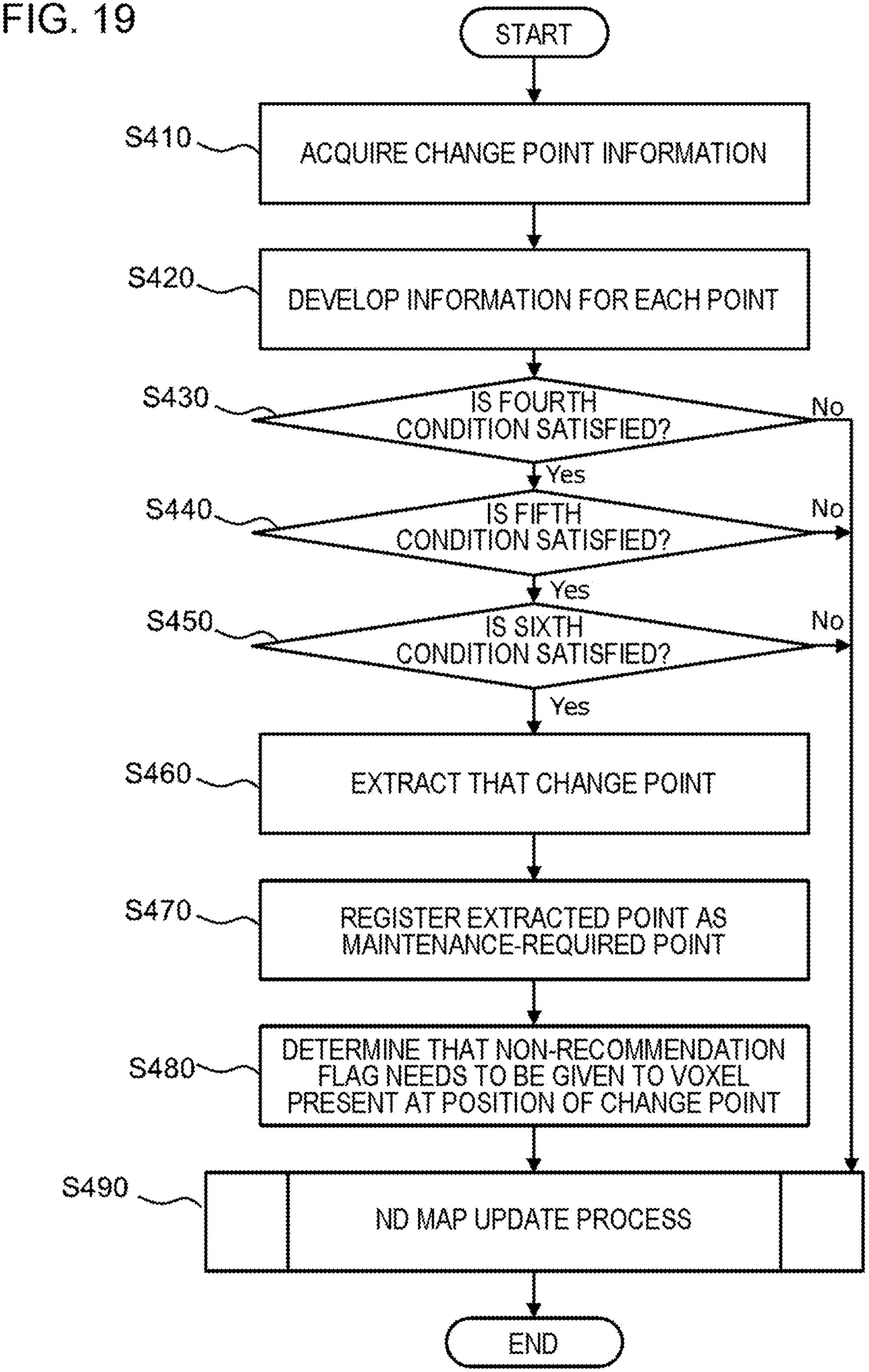

FIG. 19
START
S410
ACQUIRE CHANGE POINT INFORMATION
S420
DEVELOP INFORMATION FOR EACH POINT
S430
IS FOURTH CONDITION SATISFIED?
No
Yes
S440
IS FIFTH CONDITION SATISFIED?
No
Yes
S450
IS SIXTH CONDITION SATISFIED?
No
Yes
S460
EXTRACT THAT CHANGE POINT
S470
REGISTER EXTRACTED POINT AS MAINTENANCE-REQUIRED POINT
S480
DETERMINE THAT NON-RECOMMENDATION FLAG NEEDS TO BE GIVEN TO VOXEL PRESENT AT POSITION OF CHANGE POINT
S490
ND MAP UPDATE PROCESS
END

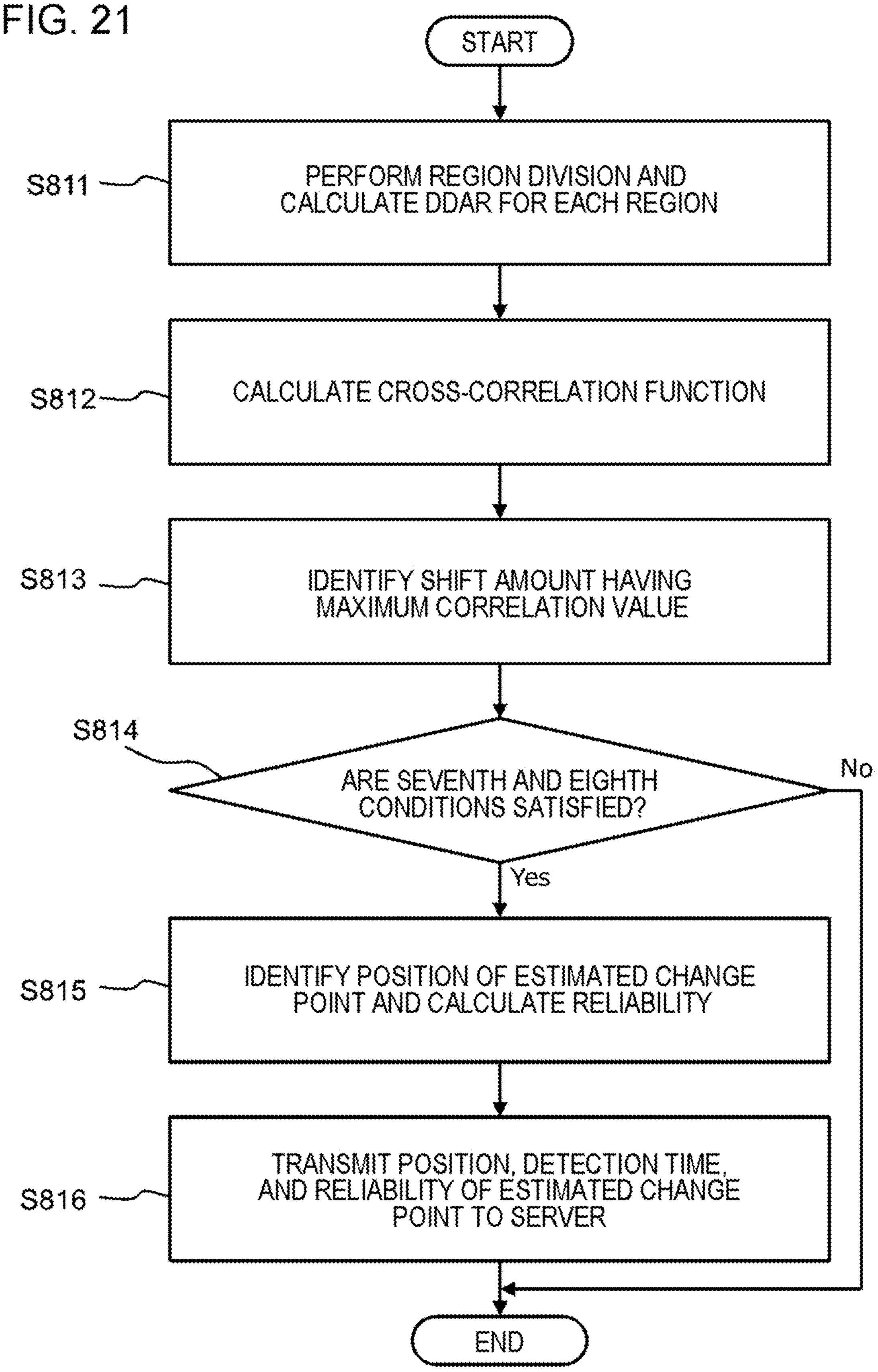

FIG. 21
START
S811
PERFORM REGION DIVISION AND CALCULATE DDAR FOR EACH REGION
S812
CALCULATE CROSS-CORRELATION FUNCTION
S813
IDENTIFY SHIFT AMOUNT HAVING MAXIMUM CORRELATION VALUE
S814
ARE SEVENTH AND EIGHTH CONDITIONS SATISFIED?
No
Yes
S815
IDENTIFY POSITION OF ESTIMATED CHANGE POINT AND CALCULATE RELIABILITY
S816
TRANSMIT POSITION, DETECTION TIME, AND RELIABILITY OF ESTIMATED CHANGE POINT TO SERVER
END

ORIGINAL ND MAP

ND MAP TO WHICH CHANGE POINT HAS BEEN INTRODUCED

AFTER FILTERING PROCESS

AFTER NORMALIZATION USING DAR

AFTER BEING LIMITED TO RANGE OF 0 TO 1

ESTIMATION APPARATUS, ESTIMATION SYSTEM, ESTIMATION METHOD, AND NON-TRANSITORY STORAGE MEDIUM

CROSS-REFERENCE TO RELATED APPLICATIONS

This application is a U.S. national stage application of International Application No. PCT/JP2023/008799, filed Mar. 8, 2023, which claims the benefit of JP 2022-038992, filed on Mar. 14, 2022, the contents of both of which are incorporated by reference.

TECHNICAL FIELD

The present invention relates to an estimation apparatus, a system, an estimation method, and a program.

BACKGROUND ART

A technique is known that detects an object present around a moving body, such as a vehicle, with a radar, a camera, or the like and collates a detection result with map information to estimate a self-position.

Patent Document 1 discloses that point cloud data measured by a LiDAR is associated with position information of an object in each unit region to estimate a position of a moving body equipped with the LiDAR. In addition, it is disclosed that a reliability index of an estimated position is calculated using a ratio of the number of associated measurement points to the number of measurement points of the point cloud data.

Patent Document 2 discloses that an evaluation function for each voxel is calculated on the basis of a collation result of point cloud data measured by a LiDAR and a map database for each voxel. In addition, it is disclosed that a voxel having a low evaluation function is extracted and matching degradation information on the voxel is transmitted to a server device.

RELATED DOCUMENTS

Patent Documents

Patent Document 1: International Publication No. WO2021/112177

Patent Document 2: International Publication No. WO2018/180338

SUMMARY OF THE INVENTION

Technical Problem

In the method that collates the detection result with the map information in this way, the accuracy of the map information is important. In a case where an actual situation is not correctly reflected in the map information, the accuracy of position estimation is likely to be reduced.

The technique of Patent Document 1 is not capable of identifying a change point where the actual situation is not correctly reflected in the map information. In the technique of Patent Document 2, there is room for improving the accuracy of estimating the change point.

An example of a problem to be solved by the present invention is to provide a technique that accurately identifies an estimated change point where the content of map information is estimated to be different from an actual situation.

Solution to Problem

An invention described in claim 1 is an estimation apparatus including: a first acquisition unit that acquires point cloud data at a plurality of timings obtained by a sensor mounted on a moving body; a second acquisition unit that acquires map information; a division unit that divides each point cloud data item acquired by the first acquisition unit into a plurality of predetermined regions; a ratio value calculation unit that calculates, for a first region and a second region different from the first region, a ratio value indicating an association ratio between each data point and the map information in each region; and an estimation unit that identifies an estimated change point where a content of the map information is estimated to be different from an actual situation, using a strength of a correlation between a ratio value of the first region shifted in time or position and a ratio value of the second region.

An invention described in claim 11 is a system including the estimation apparatus according to any one of claims 1 to 10 and a server. The estimation apparatus transmits information indicating the identified estimated change point to the server, and the server receives information indicating a plurality of the estimated change points and processes the received information indicating the plurality of estimated change points for each point to extract the estimated change point where the content of the map information is highly likely to be different from the actual situation from among the plurality of estimated change points.

An invention described in claim 13 is an estimation method executed by a computer. The estimation method includes: a first acquisition step of acquiring point cloud data at a plurality of timings obtained by a sensor mounted on a moving body; a second acquisition step of acquiring map information; a division step of dividing each point cloud data item acquired in the first acquisition step into a plurality of predetermined regions; a ratio value calculation step of calculating, for a first region and a second region different from the first region, a ratio value indicating an association ratio between each data point and the map information in each region; and an estimation step of identifying an estimated change point where a content of the map information is estimated to be different from an actual situation, using a strength of a correlation between a ratio value of the first region shifted in time or position and a ratio value of the second region.

An invention described in claim 14 is a program causing a computer to execute the estimation method according to claim 13.

BRIEF DESCRIPTION OF THE DRAWINGS

FIG. 6 is a flowchart illustrating a flow of a self-position estimation process performed by the estimation apparatus according to Example 1.

FIG. 16 is a flowchart illustrating a flow of a change point detection process performed by the estimation apparatus according to Example 1.

FIG. 19 is a flowchart illustrating a flow of a process performed by the server.

FIG. 21 is a flowchart illustrating a flow of a change point detection process performed by an estimation apparatus according to Example 2.

DESCRIPTION OF EMBODIMENTS

Figure 1:
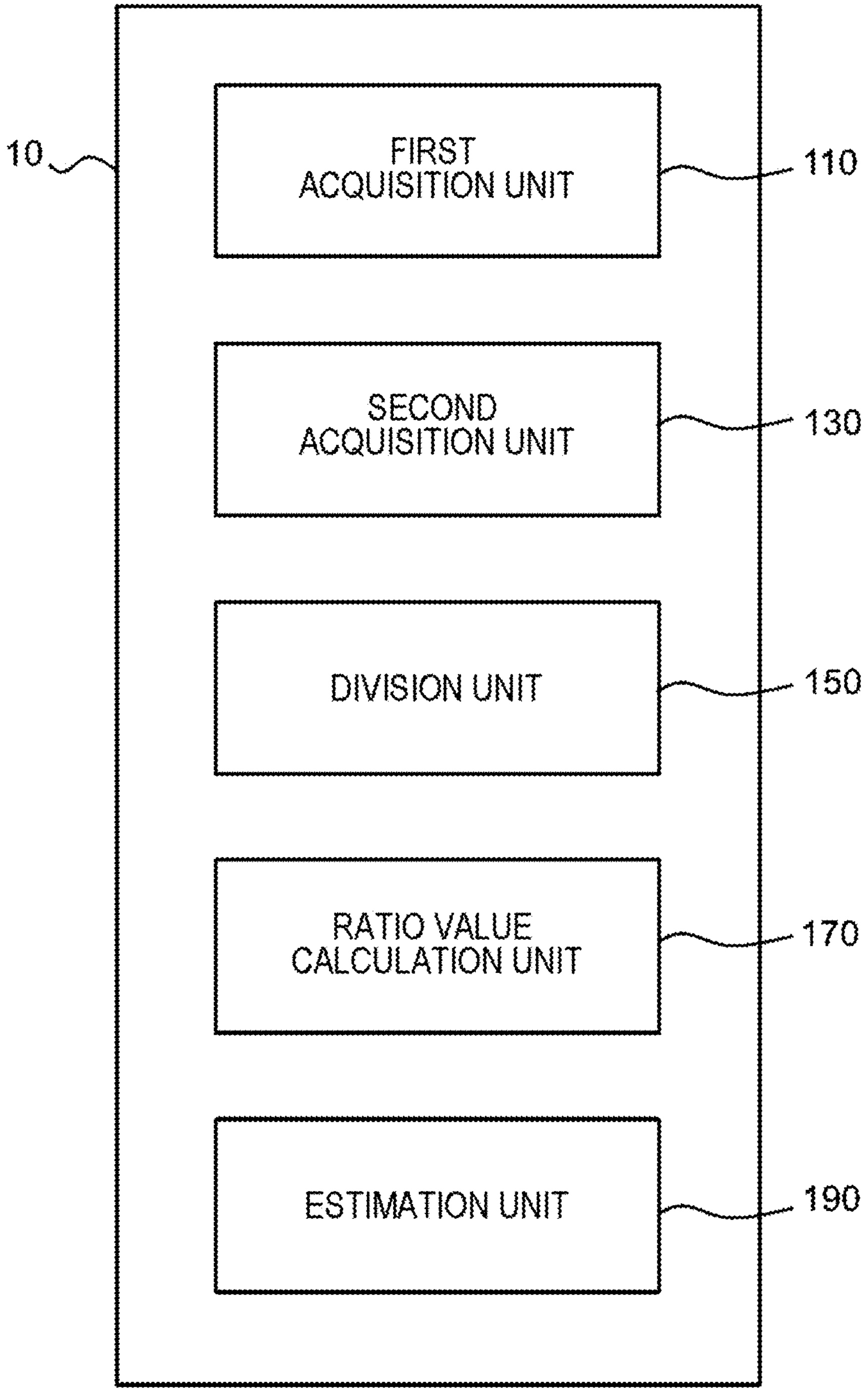
FIG. 1 is a block diagram illustrating a functional configuration of an estimation apparatus according to an embodiment.

Hereinafter, embodiments of the present invention will be described with reference to the drawings. In addition, in all of the drawings, the same components are denoted by the same reference numerals, and a description thereof will not be repeated.

FIG. 1 is a block diagram illustrating a functional configuration of an estimation apparatus 10 according to an embodiment. The estimation apparatus 10 according to the present embodiment includes a first acquisition unit 110, a second acquisition unit 130, a division unit 150, a ratio value calculation unit 170, and an estimation unit 190. The first acquisition unit 110 acquires point cloud data at a plurality of timings obtained by a sensor mounted on a moving body. The point cloud data at the plurality of timings is, for example, point cloud data at a plurality of time points. The second acquisition unit 130 acquires map information. The division unit 150 divides each point cloud data item acquired by the first acquisition unit 110 into a plurality of predetermined regions. The ratio value calculation unit 170 calculates, for a first region and a second region different from the first region, a ratio value indicating an association ratio between each data point and the map information in each region. The estimation unit 190 identifies an estimated change point where the content of the map information is estimated to be different from an actual situation, using the strength of the correlation between the ratio value of the first region shifted in time or position and the ratio value of the second region.

In the moving body such as a vehicle, it is important to accurately identify the position of the moving body in order to allow route navigation, autonomous driving, driving assistance, and the like to function with high accuracy. In a case where the moving body travels on a road, the position of the moving body at a certain time point and the movement speed or movement direction of the moving body up to the next time point are used to estimate the position of the moving body at the next time point. Here, correction for further increasing the accuracy of estimating the position of the moving body can be performed by detecting an object (target object) around the moving body with a sensor or the like and collating the detected position with the position of the object in the map information. One of such correction methods is normal distributions transform (NDT) scan matching.

The NDT scan matching is a method that matches data obtained by detecting an object around the moving body with a normal distributions (ND) map, in which a three-dimensional space has been divided into lattices (voxels) having a predetermined size and represented by a normal distribution, to calculate the self-position of the moving body. Here, the accuracy of the ND map is important for performing the highly accurate self-position estimation. Since the data of the object detected by the moving body during movement is matched with the ND map, the accuracy of the self-position estimation is reduced in a case where the accuracy of the ND map is low. Therefore, the ND map needs to have high accuracy as much as possible. On the other hand, the ND map is generated, for example, by a dedicated measurement vehicle equipped with various sensors acquiring high-density and high-accuracy three-dimensional point cloud data while actually traveling. Since a large cost is required to drive the measurement vehicle, the driving on the same road is not frequently performed. For example, the point cloud data at the same point can be acquired only several times a year. Therefore, even in a case where there is a change such as a new construction or demolition of a structure around the road, it takes time to reflect the change in the ND map. In a place (change point) where the ND map is not matched with the actual environment as described above, the accuracy of NDT self-position estimation is likely to be reduced. As a result, there is a concern that the accuracy of the navigation, the autonomous driving, the driving assistance, or the like will be affected.

The estimation apparatus 10 according to the present embodiment is capable of identifying the estimated change point where the content of the map information is estimated to be different from the actual situation. Therefore, for this point, the handling of the data of the ND map can be adjusted, or the update of the ND map can be promoted.

In the present embodiment, the map information is data that can be used as reference data for NDT scan matching. Hereinafter, the map information is also be referred to as an "ND map". The ND map includes a plurality of voxel data items. The voxel data is data in which position information or the like of a stationary structure has been recorded in each region (also referred to as a "voxel") obtained by dividing a three-dimensional space into a plurality of regions. The voxel data includes data in which the measured point cloud data of the stationary structure in each voxel is represented by a normal distribution. Specifically, the ND map includes at least the voxel ID, voxel coordinates, mean vector, covariance matrix, and point cloud number information of each of a plurality of voxels. Each voxel is a cube obtained by dividing a space into lattices, and the shape and size of the voxel are determined in advance. The voxel coordinates indicate absolute three-dimensional coordinates of a reference position such as a center position of the voxel. The mean vector and the covariance matrix correspond to parameters in a case where the point cloud in the voxel is represented by the normal distribution. The point cloud number information is information indicating the number of point clouds used for calculating the mean vector and covariance matrix of the voxel.

Figure 2:
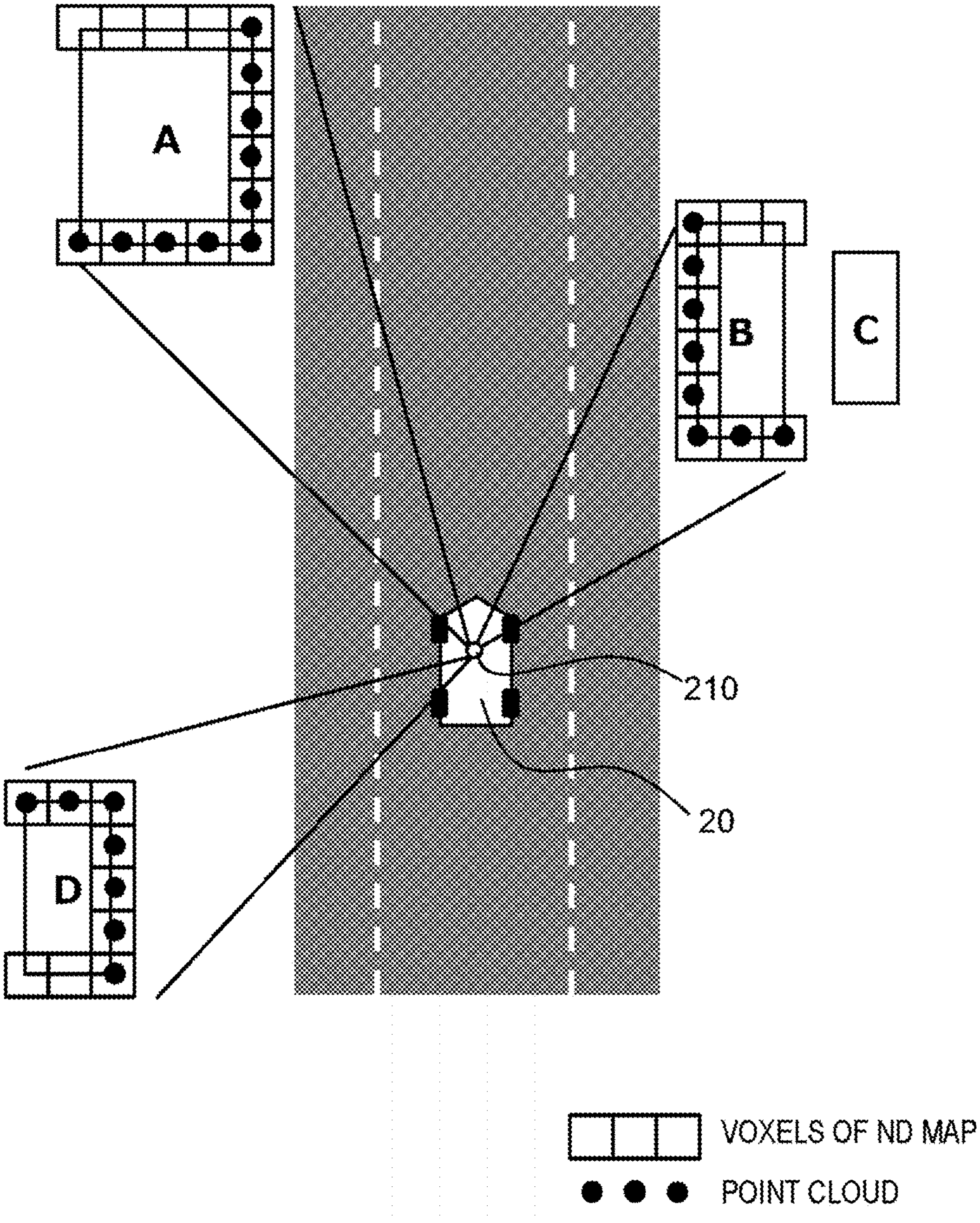
FIG. 2 is a diagram illustrating collation between data obtained by a sensor mounted on a moving body and an ND map.
Figure 3:
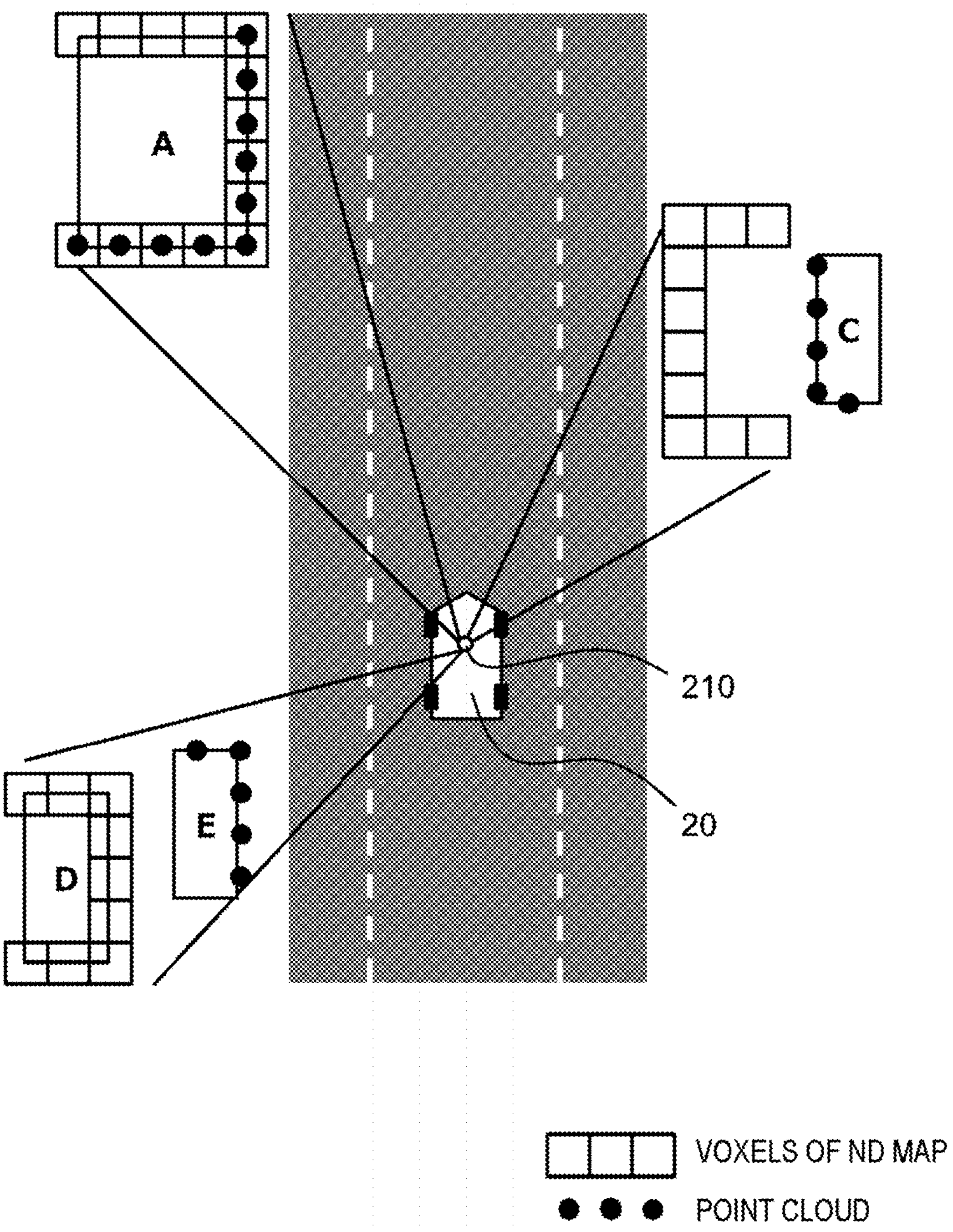
FIG. 3 is a diagram illustrating the collation between the data obtained by the sensor mounted on the moving body and the ND map.

FIGS. 2 and 3 are diagrams illustrating the collation between data obtained by a sensor 210 mounted on a moving body 20 and the ND map. FIG. 2 illustrates an example of a case where the ND map is matched with the actual situation, and FIG. 3 illustrates an example of a case where the ND map is not matched with the actual situation. In these drawings, rectangles represented by A to E indicate structures. In addition, each square indicates the voxel included in the ND map, and a black circle indicates a point cloud obtained by the sensor 210 of the moving body 20.

In the present embodiment, the sensor 210 is, for example, a sensor that emits light and receives reflected light from the target object to measure a distance to the target object. The sensor 210 is not particularly limited and is a radar, Laser Imaging Detection and Ranging or Laser Illuminated Detection and Ranging (LIDAR), Light Detection and Ranging (LiDAR), or the like. The light emitted from the sensor 210 is not particularly limited and is, for example, infrared light. In addition, the light emitted from the sensor 210 is, for example, a laser pulse. The sensor 210 calculates the distance from the sensor 210 to the target object by using, for example, the time from the emission of pulsed light to the reception of reflected light of the pulsed light and a propagation velocity of the pulsed light. The emission direction of the light from the sensor 210 is variable, and the inside of a measurement region is scanned by sequentially performing measurement in a plurality of emission directions. For example, the distance to the target object present in each angular direction can be measured by moving the emission light in a longitudinal direction while reciprocating in a lateral direction. Therefore, it is possible to obtain data of three-dimensional information within a scanning range in the lateral direction and the longitudinal direction.

The sensor 210 outputs point cloud data in which the three-dimensional position of a reflection point of light and reflection intensity (that is, the light-receiving intensity in the sensor 210) are associated with each other. The first acquisition unit 110 of the estimation apparatus 10 acquires the point cloud data. The point cloud data output from the sensor 210 is configured in units of frames. One frame is composed of data obtained by scanning the measurement region once. The sensor 210 repeatedly scans the inside of the measurement region to generate a plurality of consecutive frames. The moving body 20 may be equipped with a plurality of sensors 210 to perform scanning in different directions as viewed from the moving body 20. In addition, the sensor 210 may rotate 360° to scan the surroundings.

In the example illustrated in FIG. 2, the point cloud data obtained by detecting the structures A, B, and D near the road on which the moving body 20, which is a vehicle, travels is correctly associated with the voxels of the ND map. As a result, accurate self-position estimation is performed. It should be noted that the structure C is behind the structure B. Therefore, when the ND map is generated, a point cloud related to the structure C is not obtained, and voxels corresponding to the structure C are not present in the ND map.

In a case where a change occurs in the structures near the road on which the moving body 20 travels, the actual environment and the ND map are not matched with each other until the ND map is updated as illustrated in FIG. 3. Specifically, in the case of FIG. 3, a new structure E has been constructed between the structure D and the road. However, since the ND map has not yet been updated, there are no voxels corresponding to the structure E. In addition, the structure B has been demolished. However, since the ND map has not yet been updated, voxels originating from the structure B remain in the ND map. In the case of this figure, for the point cloud data obtained by detecting the structures C and E, the corresponding voxels are absent, and association with the voxels is not performed. That is, the point cloud data obtained by detecting the structures C and E is not used for NDT calculation, and only the point cloud data obtained by detecting the structure A is used for calculation with the voxel data. Therefore, the number of data items used for the NDT calculation is reduced, and the self-position estimation accuracy is likely to be reduced. In addition, there is also a possibility that the voxel data of the structure D will be incorrectly matched with the point cloud obtained by measuring the structure E or that the voxel data of the structure B will be incorrectly matched with the point cloud obtained by measuring the structure C. This incorrect matching may cause the large deviation of the estimated self-position from the actual position.

As described above, in a case where a state in which the actual environment and the ND map are not matched with each other occurs, it is important to detect the point as soon as possible. The reason is that, in a case in which this point can be detected, it is possible to perform a process of reducing the influence of the voxel data of the point on position estimation or to promote the update of the ND map of the point.

According to the estimation apparatus 10 of the present embodiment, the ratio value calculation unit 170 calculates, for the first region and the second region, the ratio value indicating the association ratio between each data point and the map information in each region. Then, the estimation unit 190 identifies the estimated change point where the content of the map information is estimated to be different from the actual situation, using the strength of the correlation between the ratio value of the first region shifted in time or position and the ratio value of the second region. Therefore, in a case where the state in which the actual environment and the ND map are not matched with each other occurs, it is possible to accurately identify the point.

Figure 4:
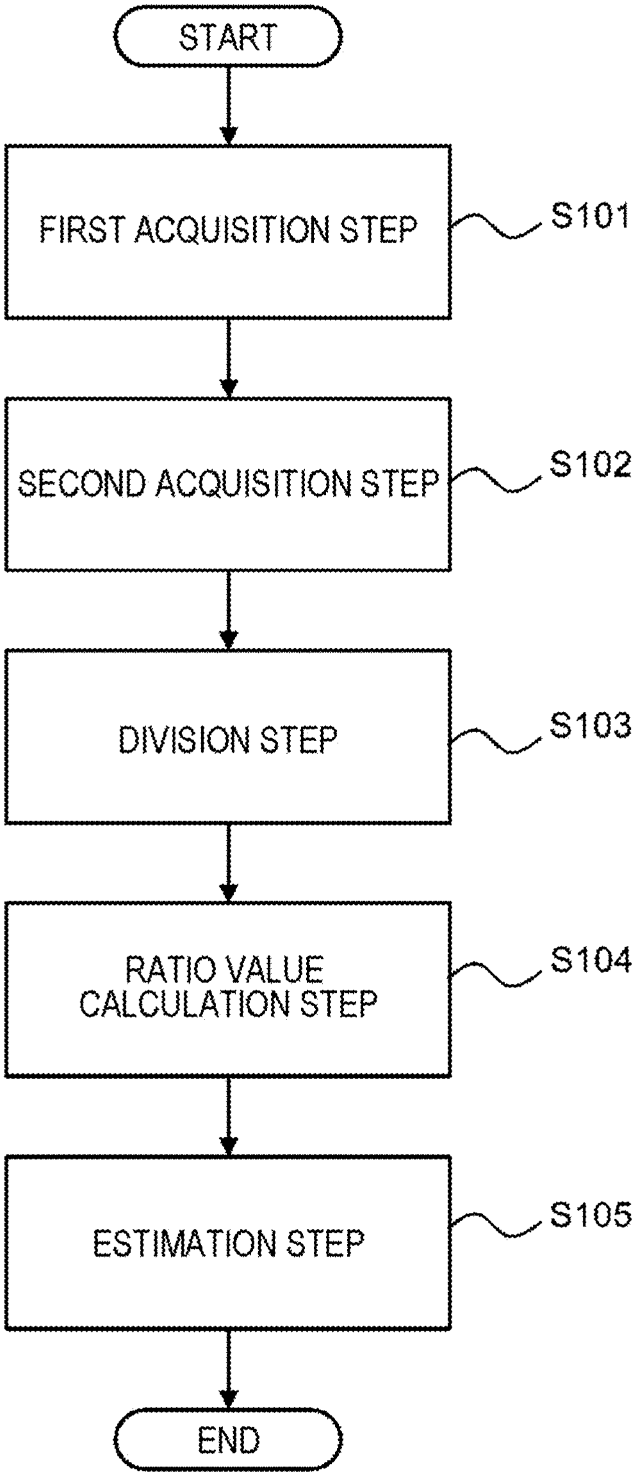
FIG. 4 is a flowchart illustrating a flow of a process performed by the estimation apparatus according to the embodiment.

FIG. 4 is a flowchart illustrating a flow of the process performed by the estimation apparatus 10 according to the present embodiment. An estimation method according to the present embodiment is executed by a computer. The estimation method according to the present embodiment includes a first acquisition step S101, a second acquisition step S102, a division step S103, a ratio value calculation step S104, and an estimation step S105. In the first acquisition step S101, the point cloud data at a plurality of timings obtained by the sensor mounted on the moving body is acquired. In the second acquisition step S102, the map information is acquired. In the division step S103, each point cloud data item acquired in the first acquisition step S101 is divided into a plurality of predetermined regions. In the ratio value calculation step S104, for the first region and the second region different from the first region, the ratio value indicating the association ratio between each data point and the map information in each region is calculated. In the estimation step S105, the estimated change point where the content of the map information is estimated to be different from the actual situation is identified using the strength of the correlation between the ratio value of the first region shifted in time or position and the ratio value of the second region.

Example 1

Figure 5:
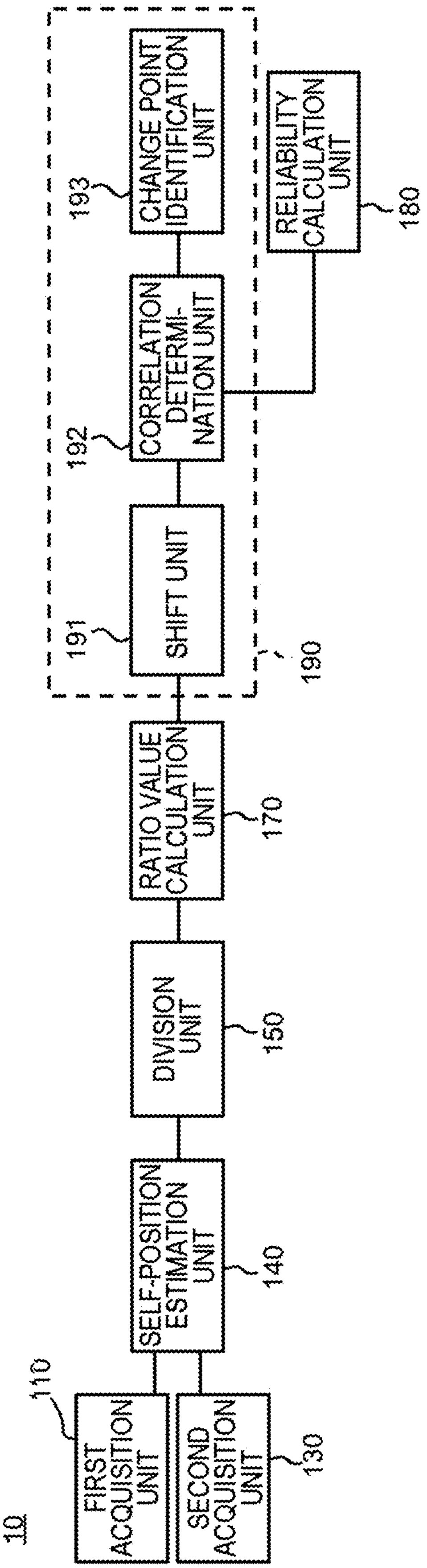
FIG. 5 is a block diagram illustrating a functional configuration of an estimation apparatus according to Example 1.

FIG. 5 is a block diagram illustrating a functional configuration of an estimation apparatus 10 according to Example 1. The estimation apparatus 10 according to the present example has the configuration of the estimation apparatus 10 according to the embodiment. The estimation apparatus 10 according to the present example further includes a self-position estimation unit 140 and a reliability calculation unit 180. In addition, the estimation unit 190 includes a shift unit 191, a correlation determination unit 192, and a change point identification unit 193.

FIG. 6 is a flowchart illustrating a flow of a self-position estimation process performed by the estimation apparatus 10 according to the present example. The self-position estimation unit 140 estimates the position of the moving body 20. Hereinafter, the sensor 210 will be described as a LiDAR. However, the sensor 210 may be other types.

When the operation of the estimation apparatus 10 is started, the estimation apparatus 10 first identifies the first estimated self-position (S10). Specifically, the self-position estimation unit 140 sets, as the first estimated self-position, a positioning result by a global navigation satellite system (GNSS) provided in the moving body 20 or the estimation apparatus 10. Then, the self-position estimation unit 140 calculates the latest predicted self-position using the previous estimated self-position (S20). Specifically, the self-position estimation unit 140 acquires the velocity and yaw angular velocity of the moving body 20 from a velocity sensor and a gyro sensor provided in the moving body 20 and identifies the movement direction and movement amount of the moving body 20 from the previous estimated self-position. Then, the self-position estimation unit 140 calculates, as the predicted self-position, a position after movement in a case where movement is performed in the identified movement direction and by the identified movement amount with respect to the previous estimated self-position.

Then, the self-position estimation unit 140 determines whether or not the ND map around the predicted self-position has already been acquired (S30). In a case where the ND map has already been acquired (Yes in S30), the self-position estimation unit 140 performs a process in S50 without performing a process in S40. In a case where the ND map has not been acquired yet (No in S30), the second acquisition unit 130 acquires the ND map around the predicted self-position (S40). The second acquisition unit 130 may read out the ND map from a storage unit that can be accessed by the second acquisition unit 130 to acquire the ND map or may acquire the ND map from the outside via a network. The storage unit that can be accessed by the second acquisition unit 130 may be provided inside the estimation apparatus 10 or may be provided outside the estimation apparatus 10.

In S40, the second acquisition unit 130 makes setting such that the voxel, to which a non-recommendation flag has been given, in the acquired ND map, not be used for NDT matching. Alternatively, the second acquisition unit 130 reduces the weight of the voxel to which the non-recommendation flag has been given. In addition, the weight is a value indicating the magnitude of the influence of the information of the voxel on the calculation of the self-position estimation in the NDT matching. The non-recommendation flag will be described in detail below.

Then, the first acquisition unit 110 determines whether or not the point cloud data has been acquired (S50). In a case where the point cloud data has not been acquired, for example, in a case where the vehicle is traveling in an open place without surrounding structures (No in S50), the process returns to S20. In a case where the point cloud data has been acquired by the first acquisition unit 110 (Yes in S50), the point cloud data is downsampled in S60. Specifically, the first acquisition unit 110 performs downsampling on the acquired point cloud data to obtain a point cloud having a predetermined number of data items.

Then, in S70, the self-position estimation unit 140 performs an NDT matching process to calculate the estimated self-position. Specifically, the self-position estimation unit 140 performs the NDT matching process using the predicted self-position as an initial value, the ND map around the predicted self-position, and the downsampled point cloud data obtained by the first acquisition unit 110. The NDT matching process and the self-position estimation using the result of the NDT matching process can be performed by the existing method. The self-position estimation unit 140 sets the obtained estimated self-position as the latest estimated self-position. The estimated self-position may be output to a device other than the estimation apparatus 10 or may be stored in a storage device that can be accessed by the self-position estimation unit 140. The estimated self-position can be used for functions such as the navigation of a route or the like, autonomous driving, and driving assistance.

Then, in S80, a change point detection process is performed by the division unit 150, the ratio value calculation unit 170, and the estimation unit 190. The change point detection process will be described in detail below with reference to FIG. 16.

In a case where the change point detection process in S80 is ended, the self-position estimation unit 140 determines whether or not an end condition is satisfied (S90). A case where the end condition is satisfied is, for example, a case where the operation of the moving body 20 is stopped or a case where an operation of stopping the estimation process executed by the estimation apparatus 10 is performed. In a case where the end condition is satisfied (Yes in S90), the estimation apparatus 10 ends the process. In a case where the end condition is not satisfied (No in S90), the process returns to S20.

A hardware configuration of the estimation apparatus 10 will be described below. Each functional component of the estimation apparatus 10 may be implemented by hardware (for example, a hard-wired electronic circuit) for implementing each functional component or may be implemented by a combination of hardware and software (for example, a combination of an electronic circuit and a program for controlling the electronic circuit). Hereinafter, a case where each functional component of the estimation apparatus 10 is implemented by a combination of hardware and software will be further described.

Figure 7:
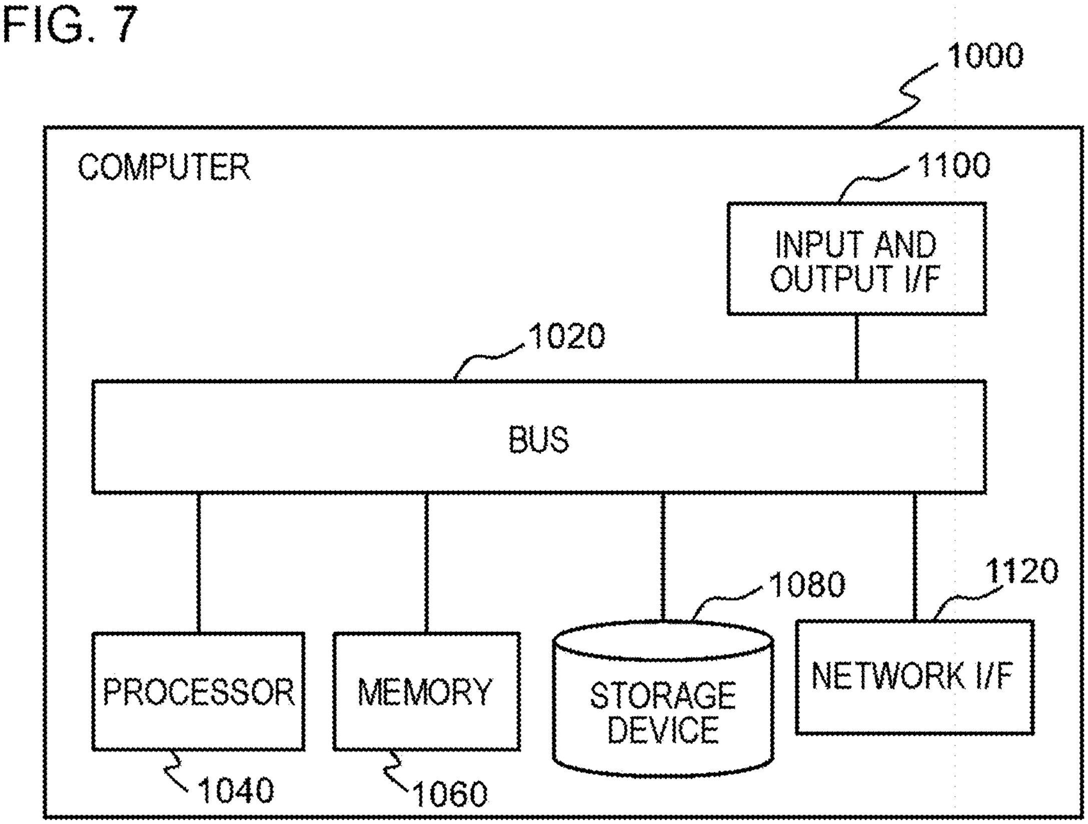
FIG. 7 is a diagram illustrating a computer for implementing the estimation apparatus.

FIG. 7 is a diagram illustrating a computer 1000 for implementing the estimation apparatus 10. The computer 1000 is any computer. For example, the computer 1000 is a system-on-chip (SoC), a personal computer (PC), a server machine, a tablet terminal, a smartphone, or the like. The computer 1000 may be a dedicated computer designed to implement the estimation apparatus 10 or may be a general-purpose computer.

The computer 1000 includes a bus 1020, a processor 1040, a memory 1060, a storage device 1080, an input and output interface 1100, and a network interface 1120. The bus 1020 is a data transmission path for the processor 1040, the memory 1060, the storage device 1080, the input and output interface 1100, and the network interface 1120 to transmit and receive data to and from each other. However, a method for connecting the processor 1040 and the like to each other is not limited to bus connection. The processor 1040 includes various processors such as a central processing unit (CPU), a graphics processing unit (GPU), and a field-programmable gate array (FPGA). The memory 1060 is a main storage device implemented using a random access memory (RAM) or the like. The storage device 1080 is an auxiliary storage device implemented using a hard disk, a solid state drive (SSD), a memory card, a read only memory (ROM), or the like.

The input and output interface 1100 is an interface for connecting the computer 1000 to input and output devices. For example, an input device, such as a keyboard, or an output device, such as a display, is connected to the input and output interface 1100.

The network interface 1120 is an interface for connecting the computer 1000 to a network. The communication network is, for example, a local area network (LAN) or a wide area network (WAN). A method for connecting the network interface 1120 to the network may be a wireless connection or a wired connection.

The storage device 1080 stores a program module that implements each functional component of the estimation apparatus 10. The processor 1040 reads out each of these program modules into the memory 1060 and executes the program modules to implement functions corresponding to each program module.

Figure 8:
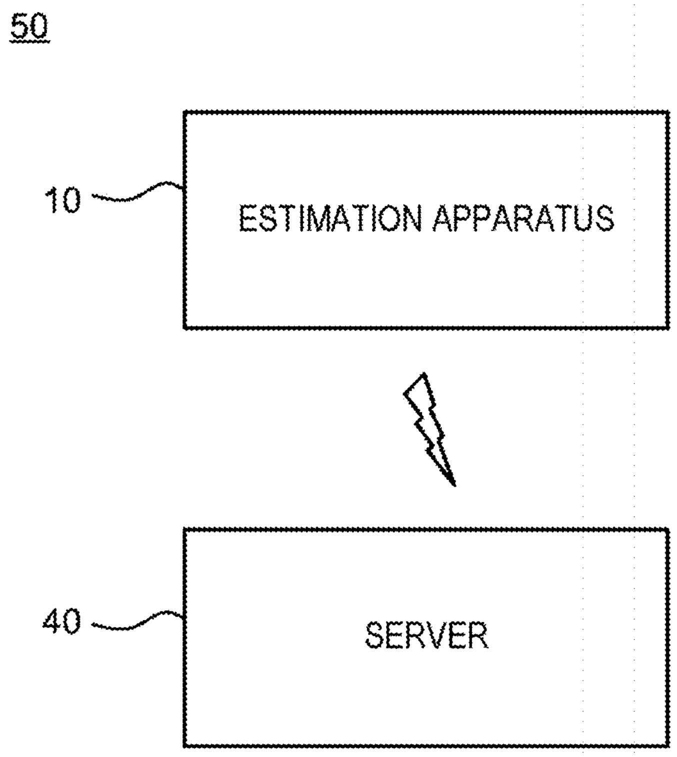
FIG. 8 is a diagram illustrating a functional configuration of a system according to Example 1.

FIG. 8 is a diagram illustrating a functional configuration of a system 50 according to the present example. The system 50 according to the present example includes the estimation apparatus 10 and a server 40. The estimation apparatus 10 transmits information indicating the identified estimated change point (hereinafter, also referred to as "change point information") to the server 40. The server 40 receives a plurality of change point information items and processes the received plurality of change point information items for each point to extract an estimated change point (hereinafter, also referred to as a "high-reliability change point"), where the content of the map information is highly likely to be different from the actual situation, from among a plurality of estimated change points indicated by the plurality of change point information items.

The estimation apparatus 10 and the server 40 can communicate with each other wirelessly. The estimation apparatus 10 is provided in, for example, the moving body 20. The server 40 may receive the change point information from a plurality of estimation apparatuses 10. The process performed by the server 40 will be described in detail below.

Each component of the estimation apparatus 10 will be described in detail below with reference to FIG. 5. The first acquisition unit 110 acquires the point cloud data generated by the LiDAR. The first acquisition unit 110 may acquire the point cloud data that has been generated by the LiDAR and stored in the storage unit or may directly acquire the point cloud data from the LiDAR. The first acquisition unit 110 acquires the point cloud data of a plurality of frames in the order in which the point cloud data has been generated. As described above, the first acquisition unit 110 performs downsampling on the acquired point cloud data.

<Division>

Figure 9:
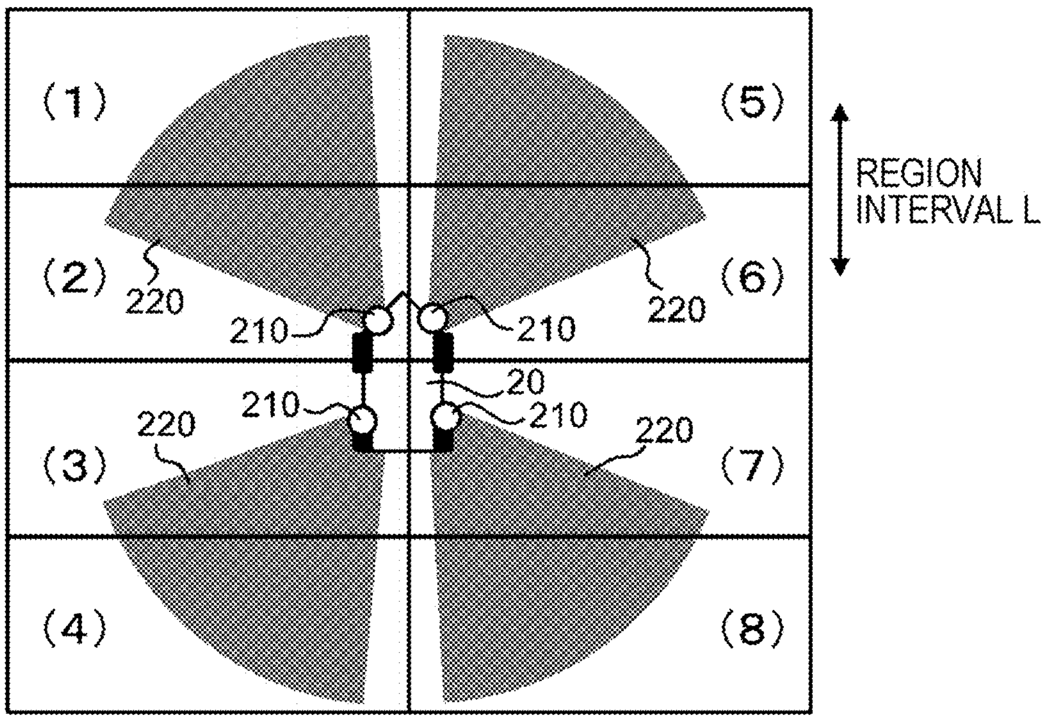
FIG. 9 is a diagram illustrating a plurality of regions.

FIG. 9 is a diagram illustrating a plurality of regions. The division unit 150 divides the point cloud data obtained for the surroundings of the moving body 20 into data of a plurality of regions on the basis of the position of the moving body 20. The position of each region based on the moving body 20 and the size of each region are predetermined. In the example illustrated in this figure, a plurality of sensors 210 are provided in the moving body 20 and repeatedly generate point cloud data within measurement regions 220 at the same timing. The first acquisition unit 110 acquires the point cloud data items of all of the sensors 210. The division unit 150 combines the point cloud data items obtained at the same timing on a coordinate system based on the moving body 20 to generate the point cloud data for the surroundings of the moving body 20. The same timing is, for example, the same time. However, the same timing does not need to be exactly the same timing, and there may be some errors. Then, which region the position of each data point is included in is identified to allocate each data point around the moving body 20 to a plurality of regions. As a result, the point cloud data of each of the plurality of regions is obtained.

In the example illustrated in this figure, the surroundings of the moving body 20 are divided into eight regions of regions (1) to (8). An interval between adjacent regions is L. In addition, the region interval L is, for example, a distance between the centers of the regions and is a distance in the traveling direction of the moving body 20. In the example illustrated in this figure, the point cloud data is divided into at least regions on the right and left sides of the moving body 20. In addition, in the example illustrated in this figure, the point cloud data is divided into at least regions in front of and behind the moving body 20 in the traveling direction. It is preferable that the point cloud data is divided into four or more regions in the traveling direction of the moving body 20. The plurality of regions do not need to have the same size.

<Ratio Value>

The ratio value calculation unit 170 calculates the ratio value indicating the association ratio between each data point and the map information in the region. Specifically, the ratio value calculation unit 170 calculates time-series ratio values for the first region and the second region. In addition, the ratio value may be the association ratio, a value obtained by inverting the ratio, or a value obtained by performing predetermined calculation on the ratio. Hereinafter, the ratio value of each region is referred to as a divided data association ratio (DDAR), and the DDAR of a region k is referred to as DDAR(k). 170 can calculate the DDAR(k) using the relationship of "DDAR(k)=the number of data items associated in the region k/the number of data items included in the region k".

Figure 10:
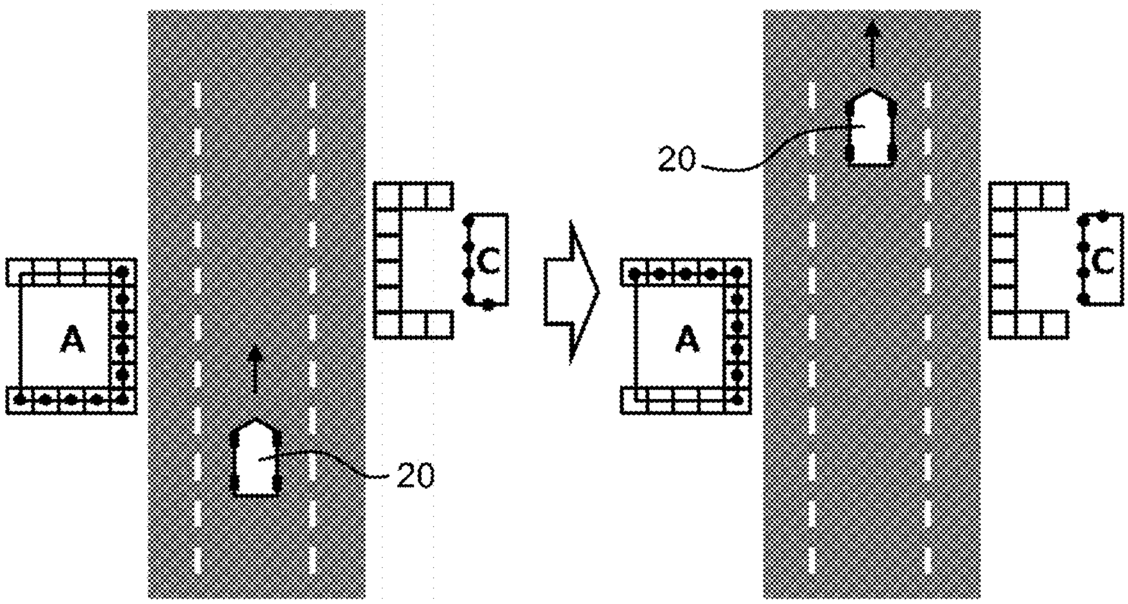
FIG. 10 is a diagram illustrating an association ratio.

FIG. 10 is a diagram illustrating the association ratio. In this figure, rectangles represented by A and C indicate structures. In addition, each square indicates the voxel included in the ND map, and a black circle indicates a point cloud obtained by the sensor 210 of the moving body 20. The association between the ND map and the point cloud data is performed by the self-position estimation unit 140. The ND map includes voxels corresponding to positions where stationary structures or the like are present. In a case where a data point of a point cloud is at a position corresponding to the position of a certain voxel, the data point is associated with the voxel. On the other hand, no voxels are present at positions where the stationary structures or the like are absent. Therefore, the data point corresponding to the position where the voxel is absent is not associated with any voxel. Therefore, it can be said that, at the point where the actual situation and the ND map are not matched with each other, the number of data points that are not associated with any voxel increases, and the association ratio is reduced.

Figure 32:
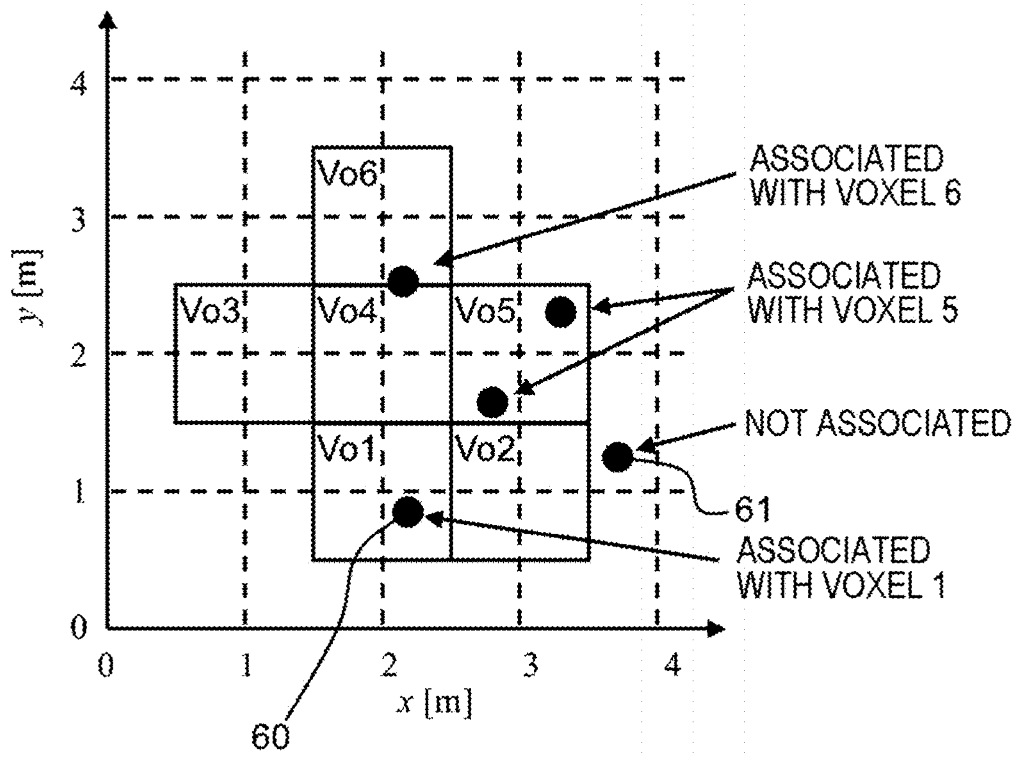
FIG. 32 is a diagram illustrating association between data points and voxels.

FIG. 32 is a diagram illustrating the association between the data points and the voxels. First, the self-position estimation unit 140 converts the coordinates of each point included in the point cloud data into a world coordinate system on the basis of the predicted self-position. Then, for example, in a case where the voxel size of the ND map is 1 m square, each of the x, y, and z coordinates of each point is rounded off to the nearest integer. Then, the self-position estimation unit 140 collates each point with the ND map indicated by the same world coordinate system to identify which voxel each point is located in and performs association.

In this figure, the voxels are two-dimensionally displayed for the sake of description. In this figure, each solid rectangle indicates the voxel. The voxel number is illustrated at the upper left side of each voxel. A black circle indicates the data point of the point cloud. For example, the x and y coordinates of a data point 60 after rounding off are (x, y)=(2, 1). Therefore, the data point 60 is associated with voxel 1 whose voxel coordinates are (x, y)=(2, 1). Further, in the example illustrated in this figure, the voxel coordinates are the coordinates of the center position of the voxel. However, the voxel coordinates are not limited thereto and may be, for example, the coordinates of any vertex of the voxel. On the other hand, the coordinates of a data point 61 after rounding off are (x, y)=(4, 1). Since there is no voxel having the voxel coordinates of (x, y)=(4, 1), the data point 61 is not associated with any voxel. The self-position estimation unit 140 performs the NDT matching process using the data point and the voxel associated with each other.

For example, in a case where the moving body 20 travels near the point where the actual environment is different from the ND map as illustrated in FIG. 10, the data point obtained by detecting the structure C is not associated, and the association ratio is reduced. In addition, it is expected that the reduction in the DDAR of each region will progress in the order of DDAR(5), DDAR(6), DDAR(7), and DDAR(8) in the example of the region division illustrated in FIG. 9. That is, in the state on the left side of FIG. 10, there is a high possibility that the DDAR will be reduced from the region (5) to the region (6). On the other hand, in the state on the right side of this figure, there is a high possibility that the DDAR will be reduced from the region (7) to the region (8).

Figure 11:
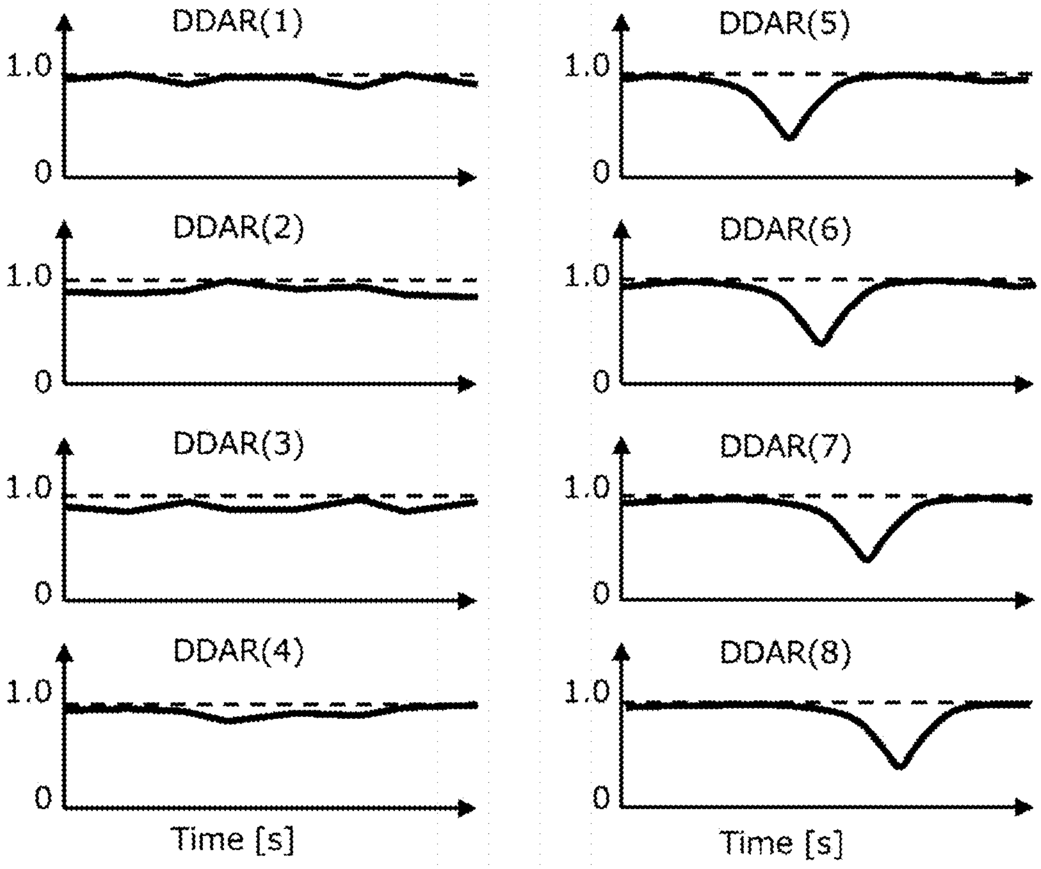
FIG. 11 is a diagram illustrating changes in DDAR(1) to DDAR(8) over time in an example illustrated in FIG. 10.

FIG. 11 is a diagram illustrating changes from DDAR(1) to DDAR(8) over time in the example illustrated FIG. 10. Each of DDAR(1) to DDAR(4) corresponding to the left side of the moving body 20 where there are no change points is maintained at a high value. On the other hand, there is a timing when the value of each of DDAR(5) to DDAR(8) corresponding to the right side of the moving body 20 where there is a change point is reduced. Then, this timing is delayed in the order of DDAR(5) to DDAR(8). Therefore, the change point can be estimated with high accuracy by ascertaining how the timing when the DDAR is reduced changes in a plurality of regions.

The first region and the second region are two different regions among the plurality of regions obtained by the division. The relationship between the first region and the second region is not particularly limited, but it is preferable that the first region and the second region are regions that shift from each other in the traveling direction of the moving body 20. In this case, it is preferable that the amount of deviation in the traveling direction is large. Specifically, for example, it is preferable that the first region is one of the frontmost region and the rearmost region in the traveling direction among the plurality of regions and the second region is the other of the frontmost region and the rearmost region. In addition, it is preferable that both the first region and the second region are regions on the right side of the moving body 20 in the traveling direction or both the first region and the second region are regions on the left side of the moving body 20 in the traveling direction. Hereinafter, an example in which the region (5) is the first region and the region (8) is the second region will be described. However, the first region and the second region are not limited to this example.

The estimation apparatus 10 does not need to use the DDARs of all of the regions obtained by the division in the estimation of the estimated change point. The processes performed by the ratio value calculation unit 170 and the estimation unit 190 only have to be performed on at least the first region and the second region. In addition, the estimation apparatus 10 may provide a plurality of sets of the first region and the second region and estimate the estimated change point. For example, the first region and the second region on the right side of the moving body 20 in the traveling direction and the first region and the second region on the left side of the moving body 20 in the traveling direction may be set, and the estimated change point may be estimated on each of the left and right sides of the moving body 20.

The ratio value calculation unit 170 acquires information indicating the result of the association between the point cloud data and the ND map in all of the regions from the self-position estimation unit 140. In addition, the ratio value calculation unit 170 counts the number of data points included in each divided region. Then, the number of data points associated with the voxels in each region is counted. Then, the number of associated data points is divided by the number of data points included in the region to calculate the DDAR for each region.

Further, the ratio value calculation unit 170 performs some processes on the DDAR in order to improve the estimation accuracy of the change point. Hereinafter, a filtering process and a normalization process will be described. All of these processes are not necessarily performed, but it is preferable to perform all of these processes in order to improve the estimation accuracy. In addition, these processes may be performed on the ratio value before shifting, which will be described below, or may be performed on the ratio value after shifting.

<<Filtering Process>>

When the point cloud data is divided into a plurality of regions, the number of data items in each region is reduced. Therefore, a change in DDAR due to an increase or decrease in the DDAR is likely to be significant. In a case where there is an instantaneous increase or decrease in the DDAR, the instantaneous increase or decrease is likely to be noise in the subsequent correlation determination. Therefore, it is preferable that an appropriate filtering process is performed on the DDAR to suppress the instantaneous fluctuation.

For example, it is preferable that the ratio value calculation unit 170 performs a first-order lag filtering process on the DDAR of each region. Specifically, it is preferable that the ratio value calculation unit 170 performs the first-order lag filtering process, in which a value that is equal to or greater than 10 times the cycle of the NDT process and equal to or less than 20 times the cycle is set as a time constant, on the DDAR of each region. This makes it possible to ascertain the tendency of the change while suppressing the instantaneous fluctuation of the DDAR. As a result, it is possible to improve the stability of the correlation determination.

<<Normalization>>

Figure 12:
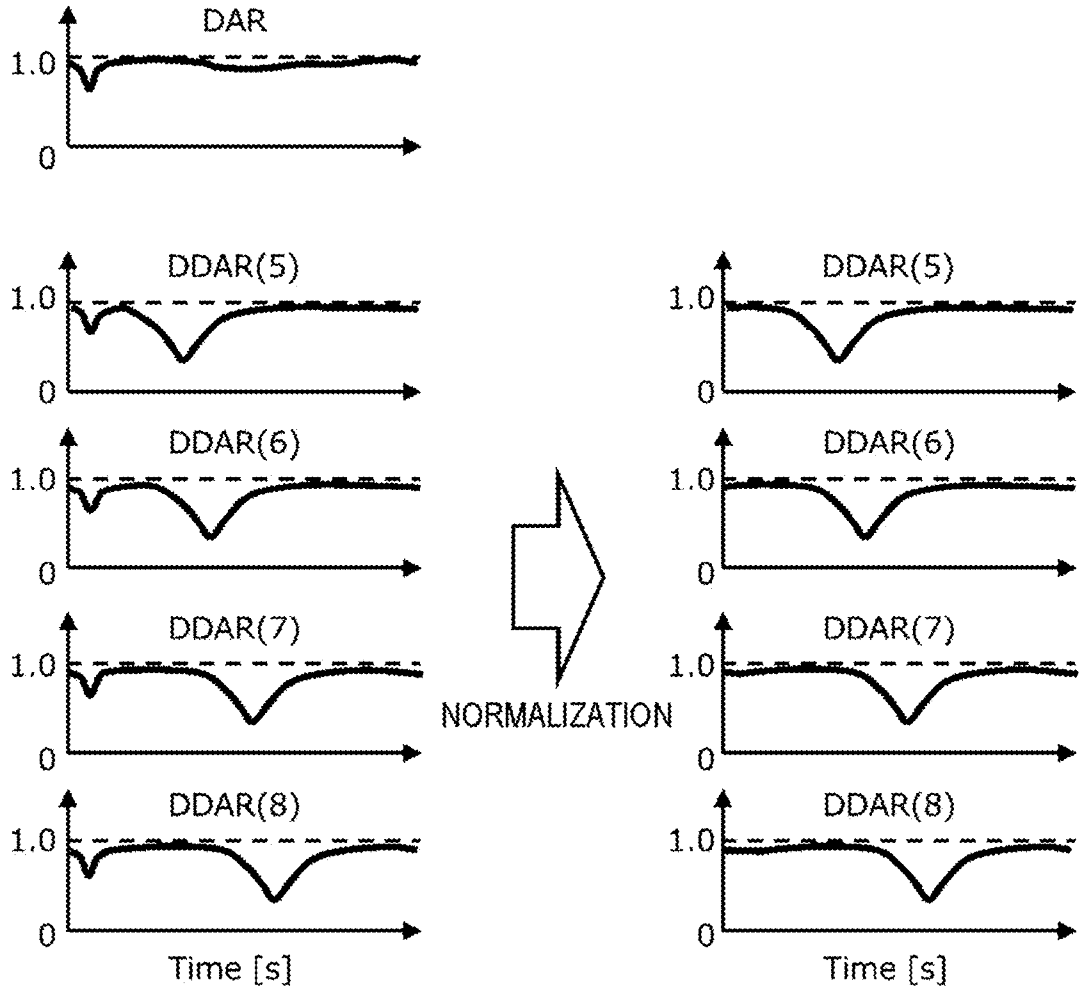
FIG. 12 is a diagram illustrating an example of normalization of DDAR.

FIG. 12 is a diagram illustrating an example of the normalization of the DDAR. In a case where an error occurs in the self-position estimation by the NDT due to some influence and the estimated self-position deviates from the correct position, the association ratio between the point cloud data and the voxel is reduced overall. In this situation, the value of the DDAR of each region is reduced at the same time. This is not due to the change point and thus becomes an error in the correlation determination for detecting the change point.

Therefore, in the present example, the ratio value calculation unit 170 calculates an overall ratio value data association ratio (DAR) indicating an association ratio between each data point of the point cloud data before the division and the map information and normalizes the ratio value of the first region and the ratio value of the second region with the overall ratio value DAR. Then, the estimation unit 190 identifies the estimated change point using the normalized ratio values. This makes it possible to reduce the influence due to the deviation of the estimated self-position.

Specifically, the ratio value calculation unit 170 calculates the DAR using information indicating the result of the association between the point cloud data and the ND map in all of the regions which has been acquired from the self-position estimation unit 140. The DAR can be calculated using a relationship of "DAR=the number of data items associated in all of the regions/the number of data items included in all of the regions". In addition, the ratio value calculation unit 170 divides DDAR(k) of each region by the DAR to normalize DDAR(k).

In addition, in some cases, the DDAR is larger than the DAR. Therefore, the DDAR may be greater than 1 in a case where the normalization is performed. In the correlation determination which will be described below, since it is desirable that the upper limit of the DDAR is 1, the ratio value calculation unit 170 may further perform a limit process of limiting the value of the DDAR to a range of 0 or more and 1 or less. That is, in a case where the value of the normalized DDAR is greater than 1, the ratio value calculation unit 170 replaces the value with 1.

<Identification of Estimated Change Point>

In the present example, the estimation unit 190 identifies the estimated change point using the strength of the correlation between a post-shift ratio value obtained by shifting the time of the ratio value of the first region and the ratio value of the second region. Specifically, the estimation unit 190 generates the post-shift ratio value by shifting a time axis of the ratio value of the first region by a time τ so as to be matched with a time axis of the ratio value of the second region. Then, the estimation unit 190 identifies the estimated change point using the generated post-shift ratio value of the first region and the ratio value of the second region. Here, the time τ is a time calculated by using the velocity of the moving body. In order to identify the estimated change point, the estimation unit 190 multiplies the post-shift ratio value of the first region by the ratio value of the second region to calculate a first index. In addition, the estimation unit 190 subtracts one of the post-shift ratio value of the first region and the ratio value of the second region from the other to calculate a second index. Then, the estimated change point is identified using the first index and the second index. In addition, the identification of the estimated change point will be described in detail below.

Figure 13:
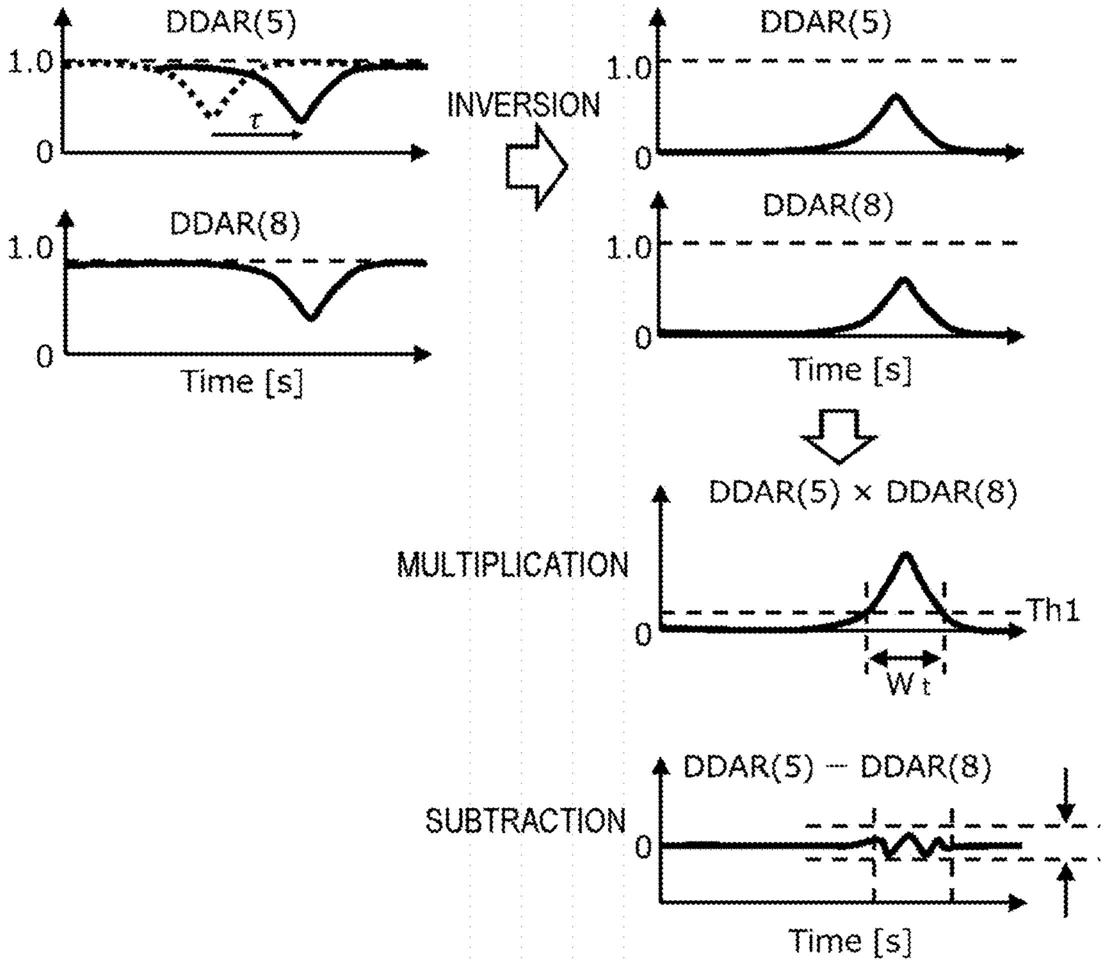
FIG. 13 is a diagram illustrating a process performed by an estimation unit.

FIG. 13 is a diagram illustrating the process performed by the estimation unit 190. In a case where there is a change point, the time-series DDAR has a portion in which the value is reduced, and the portion in which the value is reduced appears with a little shift over a plurality of regions. That is, it is presumed that there is a strong correlation between the DDARs of the plurality of regions shifted in time according to the movement of the moving body 20. Therefore, the estimated change point can be identified by evaluating the strength of the correlation.

For example, in a case where the region (5) is set as the first region and the region (8) is set as the second region, the region interval between the regions is 3L. The estimation unit 190 divides the region interval 3L by the velocity of the moving body 20 to calculate the time τ when the moving body 20 moves a distance of 3L. Then, the estimation unit 190 shifts the time axis of DDAR(5) by the time τ. In this way, DDAR(5) after shifting, that is, the post-shift ratio value is obtained.

The correlation determination unit 192 determines the correlation between the post-shift ratio value of the region (5) and the ratio value of the region (8) using the post-shift ratio value of the region (5) and the ratio value of the region (8). Specifically, first, the correlation determination unit 192 inverts each of DDAR(5) after shifting and DDAR(8). That is, a value obtained by subtracting DDAR(k) before the inversion from 1 is set as DDAR(k) after the inversion. Then, DDAR(5) after the inversion and DDAR(8) after the inversion are multiplied to obtain a first index M. Further, the correlation determination unit 192 subtracts DDAR(8) from DDAR(5) after shifting to obtain a second index S. The time-series first index M and the time-series second index S are obtained using the time-series DDAR(5) and the time-series DDAR(8).

Figure 14:
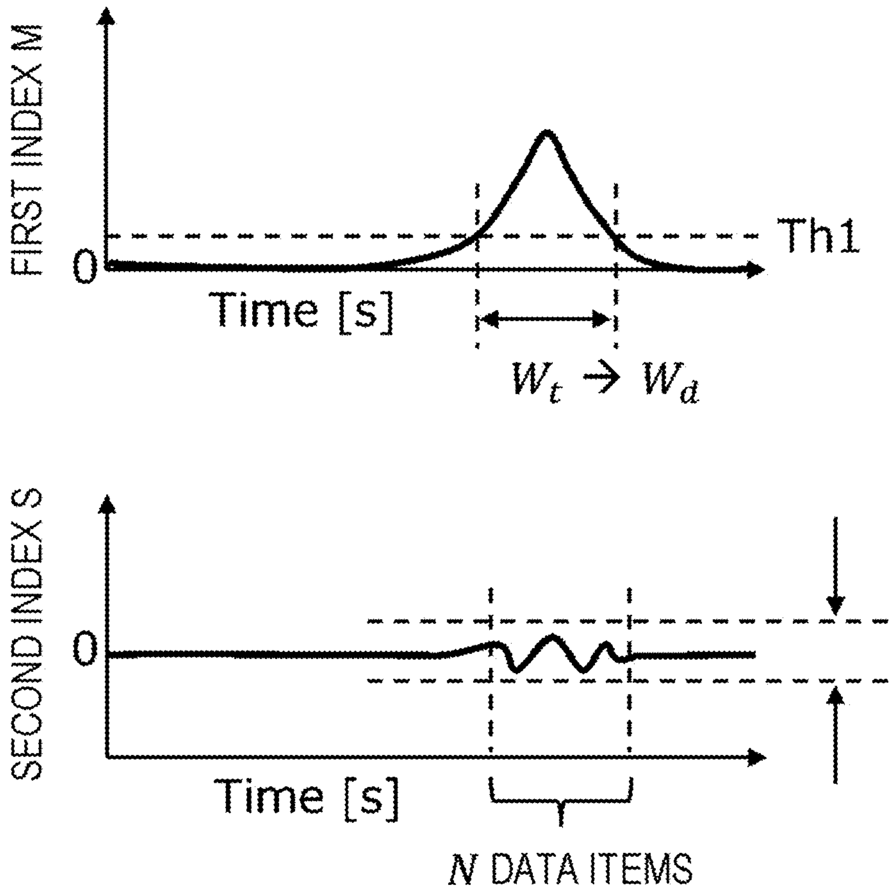
FIG. 14 is a diagram illustrating a condition for determining a correlation.

FIG. 14 is a diagram illustrating conditions for determining the correlation. The correlation determination unit 192 determines whether or not each of the following first to third conditions is satisfied for the first index M and the second index S. In a case where all of the first to third conditions are satisfied, the correlation determination unit 192 determines that the correlation between DDAR(5) and DDAR(8) is strong.

The first condition is represented by $W_d = W_t \times v \geq Th2$. $W_t$ is a time width of a period for which the first index M is continuously equal to or greater than a threshold value Th1. The threshold value Th1 is, for example, equal to or greater than 0.01 and equal to or less than 0.1 and is preferably 0.04. v is a velocity of the moving body 20. The threshold value Th2 is, for example, equal to or greater than 1 m and equal to or less than 8 m and is preferably 5 m.

The second condition is represented by the following Expression (1). That is, the second condition is that an average value $M_{ave}$ of the first index M (M(k)) in the period for which the first index M is continuously equal to or greater than the threshold value Th1 is greater than a threshold value Th3. In Expression (1), N is the number of data items in the period for which the first index M is continuously equal to or greater than the threshold value Th1. The threshold value Th3 is, for example, equal to or greater than 0.01 and equal to or less than 0.1 and is preferably 0.05.

[Equation 1]

$$M_{ave} = \frac{1}{N}\sum_{k=1}^{N} M(k) \geq Th3 \tag{1}$$

The third condition is represented by the following Expression (2). That is, the third condition is that a deviation $S_{dev}$ of the second index S (S(k)) in the period for which the first index M is continuously equal to or greater than the threshold value Th1 is less than a threshold value Th4. The threshold value Th4 is, for example, equal to or greater than 0.1 and equal to or less than 0.5 and is preferably 0.2.

[Equation 2]

$$S_{dev} = \sqrt{\frac{1}{N}\sum_{k=1}^{N} S^2(k)} \leq Th4 \tag{2}$$

Figure 15:
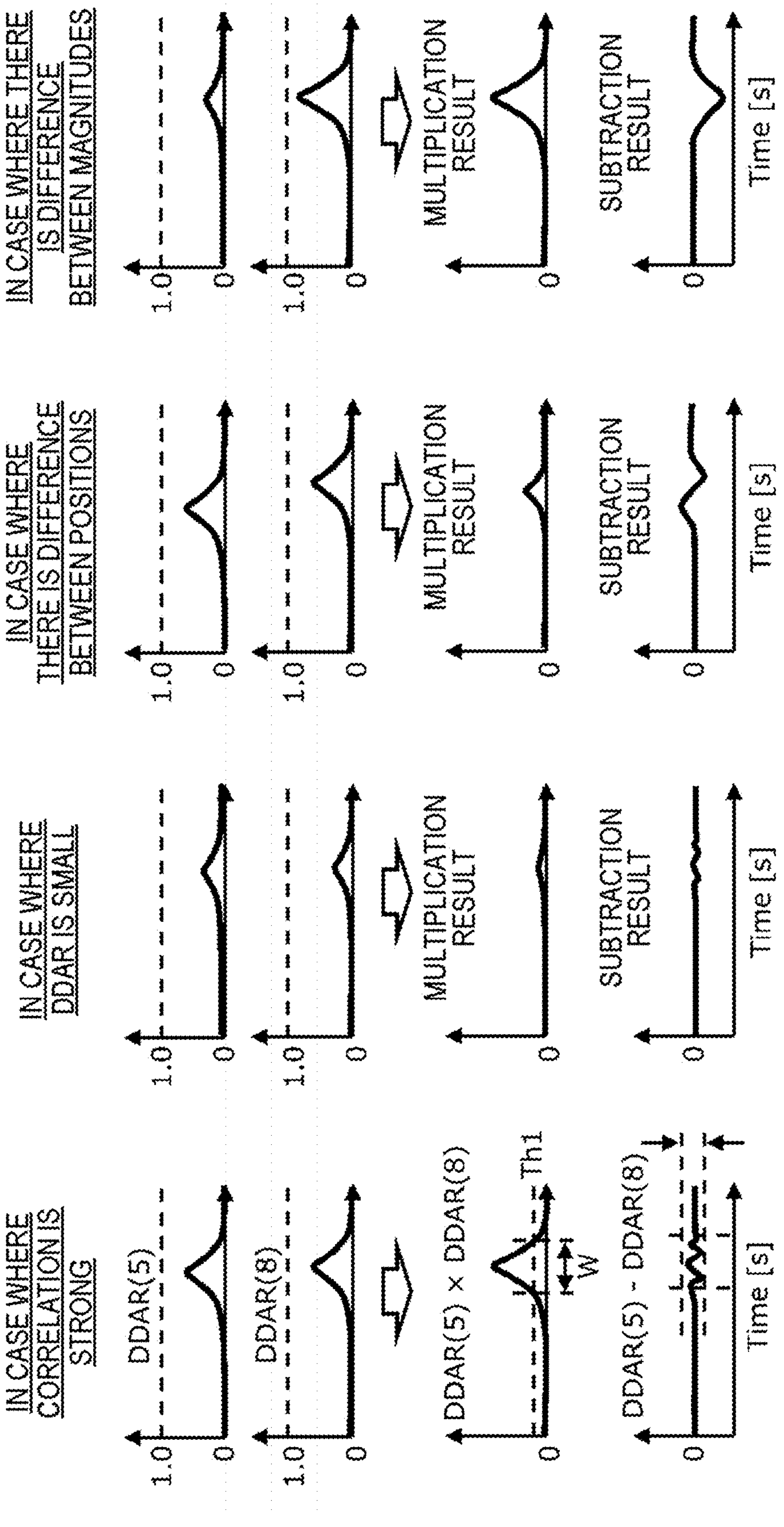
FIG. 15 is a diagram illustrating meanings of first to third conditions.

FIG. 15 is a diagram illustrating the meanings of the first to third conditions. As illustrated in the leftmost column of this figure, in a case where two DDARs are large to some extent and have substantially the same size and the positions thereof are matched with each other, the multiplication result is large, and the subtraction result is small. In this case, it can be said that there is a strong correlation between the two DDARs.

As illustrated in the second column from the left, in a case where two DDARs are small, the multiplication result is small even though peak positions are matched with each other. As illustrated in the third column from the left, when there is a difference between the peak positions, even though two DDARs are large to some extent, the multiplication result is small, and the deviation of the subtraction result is large. In addition, as illustrated in the fourth column from the left, in a case where one DDAR is small, the multiplication result is large, and the deviation of the subtraction result is also large.

Therefore, detecting a case where the multiplication result (first index M) is large and the deviation of the subtraction result (second index S) is small allows a state in which the correlation between two DDARs is strong to be detected and thus the estimated change point to be identified.

However, the correlation determination unit 192 may evaluate the correlation between two DDARs using a method other than the above method. In addition, the correlation determination unit 192 may evaluate the correlation between two DDARs using only one of the first index and the second index.

In a case where it is determined that all of the first to third conditions are satisfied, the correlation determination unit 192 identifies the period for which the first index M is continuously equal to or greater than the threshold value Th1 as the period in which the change point is reflected. Then, the change point identification unit 193 identifies the timing when the data in this period was obtained at DDAR(8) and identifies, as a change point direction, the direction of DDAR(8) as viewed from the moving body 20. Then, the change point identification unit 193 identifies the position in the change point direction as the position of the estimated change point on the basis of the estimated self-position at that timing.

<Reliability>

The estimation apparatus 10 according to the present example further calculates a reliability related to the estimated change point. Then, the calculated reliability is transmitted to the server 40. The server 40 can extract the estimated change point where the content of the map information is highly likely to be different from the actual situation from the plurality of estimated change points, using the received reliability.

When the estimated change point is identified by the change point identification unit 193, the reliability calculation unit 180 calculates a reliability for the change point estimation. Specifically, for $W_d$, $M_{ave}$, and $S_{dev}$ calculated in the determination of the first to third conditions, as $W_d$ is larger, as $M_{ave}$ is larger, and as $S_{dev}$ is smaller, the reliability for the change point (or the importance of the change point) is higher.

The change point identification unit 193 may calculate a reliability $R_{cp}$ using the following Expressions (3) to (6). Each of a, b, and c is a predetermined coefficient. All of $R_{cp1}$, $R_{cp2}$, and $R_{cp3}$ which are calculation results of Expression (3), Expression (4), and Expression (5), respectively, are values in a range of 0 to 1. Therefore, as all of $R_{cp1}$, $R_{cp2}$, and $R_{cp3}$ are larger, the reliability $R_{cp}$ is also higher and closer to 1. In addition, when any of $R_{cp1}$, $R_{cp2}$, and $R_{cp3}$ is close to 0, the reliability $R_{cp}$ is reduced.

[Equation 3]

$$R_{cp1} = 1 - \exp(-a \times W_d) \tag{3}$$

$$R_{cp2} = 1 - \exp(-b \times M_{ave}) \tag{4}$$

$$R_{cp3} = \exp(-c \times S_{dev}) \tag{5}$$

$$R_{cp} = R_{cp1} \times R_{cp2} \times R_{cp3} \tag{6}$$

The estimation apparatus 10 associates the time when the estimated change point was identified and the reliability with the information indicating the position of the estimated change point and transmits the information to the server 40. The server 40 receives the information transmitted from the estimation apparatus 10.

FIG. 16 is a flowchart illustrating a flow of the change point detection process performed by the estimation apparatus 10 according to the present example. When S80 illustrated in FIG. 6 is started, in S801, the division unit 150 divides the point cloud data into data of a plurality of regions. Then, the ratio value calculation unit 170 calculates the DDAR of each region. In addition, the ratio value calculation unit 170 performs the filtering process and the normalization on the DDAR.

Then, in S802, the shift unit 191 calculates a shift amount on the basis of the velocity of the moving body 20 and shifts the DDAR of the first region. Then, in S803, the correlation determination unit 192 inverts the DDAR of the first region after the shifting and the DDAR of the second region and calculates the first index and the second index using both the inverted DDARs. In addition, in S804, the correlation determination unit 192 calculates $W_d$, $M_{ave}$, and $S_{dev}$ using the first index and the second index.

Then, the correlation determination unit 192 determines whether or not the calculated $W_d$, $M_{ave}$, and $S_{dev}$ satisfy the first to third conditions, respectively (S805). In a case where at least any of the first to third conditions is not satisfied (No in S805), the change point is not detected, and the change point detection process is ended. On the other hand, in a case where all of the first to third conditions are satisfied (Yes in S805), the change point identification unit 193 identifies the position of the estimated change point using the estimated self-position identified by the self-position estimation unit 140. In addition, the reliability calculation unit 180 generates the reliability related to the estimated change point using $W_d$, $M_{ave}$, and $S_{dev}$ (S806). Then, in S807, information indicating the position, detection time, and reliability of the estimated change point is transmitted from the estimation apparatus 10 to the server 40. Then, the change point detection process is ended.

<Process by Server>

Figure 17:
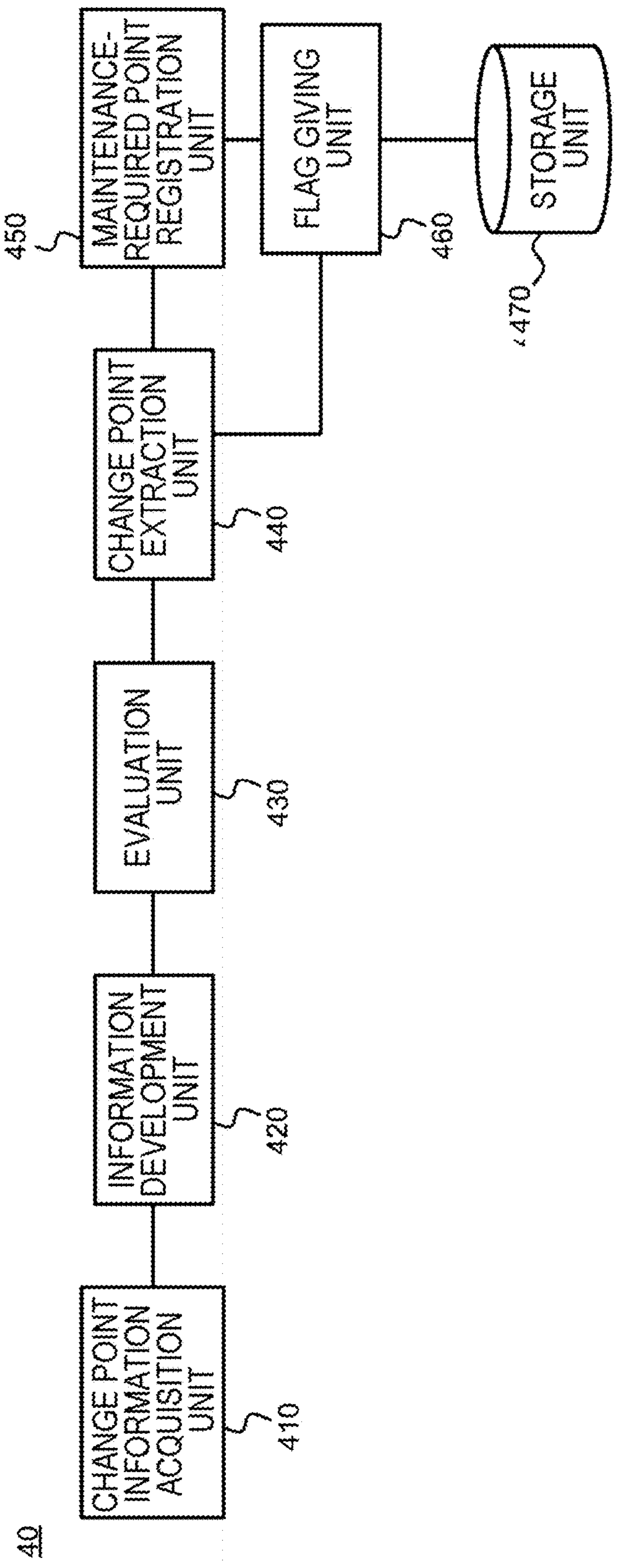
FIG. 17 is a block diagram illustrating a functional configuration of a server according to Example 1.

FIG. 17 is a block diagram illustrating a functional configuration of the server 40 according to the present example. The server 40 according to the present example includes a change point information acquisition unit 410, an information development unit 420, an evaluation unit 430, a change point extraction unit 440, a maintenance-required point registration unit 450, and a flag giving unit 460.

As described above, when the estimation apparatus 10 identifies the estimated change point, the change point information is transmitted from the estimation apparatus 10 to the server 40. The change point information acquisition unit 410 acquires the change point information from the estimation apparatus 10. The estimation apparatus 10 transmits the change point information each time the estimated change point is identified. In addition, the server 40 may acquire the change point information from a plurality of estimation apparatuses 10. As a result, the change point information acquisition unit 410 acquires a plurality of change point information items. The information development unit 420 develops the change point information acquired by the change point information acquisition unit 410 into information for each point. For example, in a case in which the positions indicated by the plurality of change point information items are within a predetermined region on the map, the information development unit 420 groups the change point information items as information related to the same point. The development of the information by the information development unit 420 may be performed each time the change point information acquisition unit 410 acquires the change point information or may be performed at a predetermined cycle.

The evaluation unit 430 evaluates the reliability of the estimated change point for each point, that is, for each grouped information described above. For example, the evaluation unit 430 performs determination for each point using, for example, the detection time associated with the change point information, the number of cases where the change point information was acquired, and the reliability $R_{cp}$ associated with the change point information to extract a high-reliability change point where the content of the map information is highly likely to be different from the actual situation. However, the evaluation unit 430 may perform the determination using only one or two of the detection time, the number of cases, and the reliability $R_{cp}$. In addition, in a case where no detection time is associated with the change point information, the time when the change point information acquisition unit 410 acquired the change point information may be used instead of the detection time.

For example, in a case where all of a fourth condition, a fifth condition, and a sixth condition which will be described below are satisfied, the evaluation unit 430 determines that the point is the high-reliability change point. This makes it possible for the change point extraction unit 440 to extract the high-reliability change point from among the plurality of estimated change points indicated by the plurality of change point information items acquired by the change point information acquisition unit 410.

Figure 18:
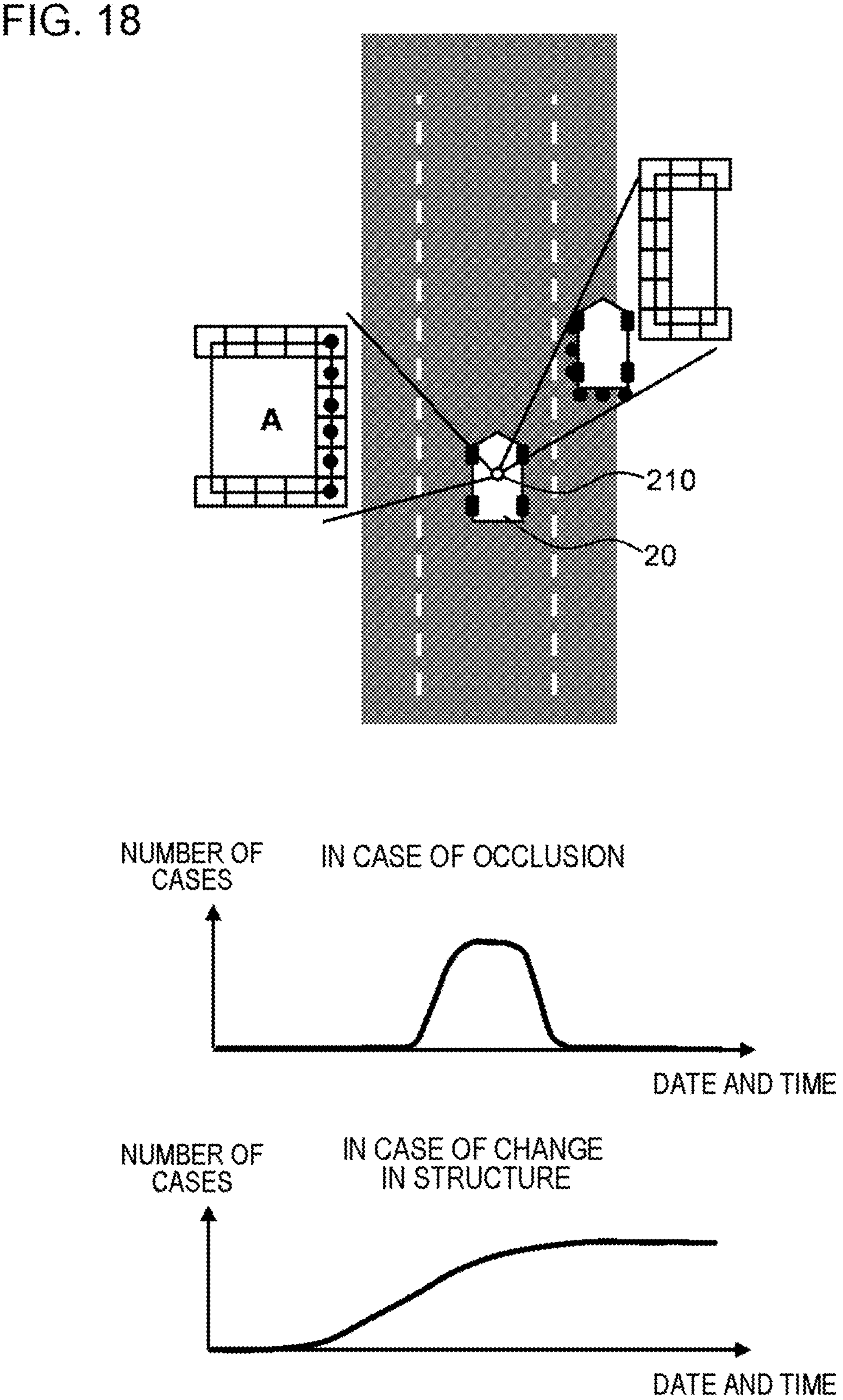
FIG. 18 is a diagram illustrating determination based on a detection time point of change point information.

FIG. 18 is a diagram illustrating the determination based on the detection time of the change point information. For example, the process progresses as follows: in a case where the change point is detected due to occlusion caused by a parked vehicle as illustrated in this figure, the change point is detected at a certain time and then is no longer detected again. The reason is that, in a case where the parked vehicle is moved and disappears, the parked vehicle is not detected as the change point. In addition, a change in the number of detections is rapid. In a case where the detection time is temporary as described above, it can be determined that the content of the map information is less likely to be different from the actual situation. On the other hand, since the construction or demolition of the structure is not performed instantaneously, the number of detections is gradually increased, and a state in which the number of detections is large is maintained. In this case, it can be determined that the content of the map information is highly likely to be different from the actual situation.

The evaluation unit 430 identifies the number of detections (that is, the number of change point information items acquired by the change point information acquisition unit 410) for each detection time point. Then, it is determined whether or not a state in which the number of detections is equal to or greater than a predetermined value continues for a predetermined period of time or longer. The fourth condition is a condition related to duration and is that a state in which the number of detections is equal to or greater than a predetermined value $N_1$ continues for a predetermined period of time or longer.

In addition, the evaluation unit 430 counts the number of acquired change point information items for each point. Then, the evaluation unit 430 determines whether or not the number of acquired change point information items is equal to or greater than a predetermined value $N_2$. The fifth condition is a condition related to the number of detected change point information items and is that the number of acquired change point information items is equal to or greater than the predetermined value $N_2$.

Further, the evaluation unit 430 calculates an average value of the reliabilities $R_{cp}$ associated with the acquired plurality of change point information items for each point. Then, it is determined whether or not the calculated average value is equal to or greater than a predetermined value. The sixth condition is a condition related to the reliability and is that the average value of the reliabilities $R_{cp}$ is equal to or greater than a predetermined value.

The change point extraction unit 440 extracts the high-reliability change point from the plurality of estimated change points on the basis of the evaluation result by the evaluation unit 430. Then, the maintenance-required point registration unit 450 registers the extracted high-reliability change point as a point where the maintenance of the ND map is required in the database. In this case, a higher priority of maintenance may be set to a point where the number of acquired change point information items is larger. In the update work of the ND map, this database can be checked to ascertain the point that needs to be re-measured preferentially and to achieve the accurate ND map. The database is stored in a storage unit 470 that can be accessed by the maintenance-required point registration unit 450.

The flag giving unit 460 gives the non-recommendation flag to the voxel corresponding to the high-reliability change point extracted by the change point extraction unit 440 in the ND map.

A hardware configuration of a computer implementing the server 40 is as illustrated in, for example, FIG. 7 similarly to the estimation apparatus 10. However, a program module that implements each functional component of the server 40 according to the present example is stored in the storage device 1080 of the computer 1000 implementing the server 40. In addition, the storage unit 470 is implemented by the storage device 1080.

FIG. 19 is a flowchart illustrating a flow of the process performed by the server 40. In a case in which the change point information acquisition unit 410 acquires the change point information in S410, the information development unit 420 develops the change point information into information for each point (S420). Then, the evaluation unit 430 determines whether or not the fourth condition is satisfied for the point to which the change point information belongs (S430). In a case where the fourth condition is not satisfied (No in S430), the point is not extracted as the high-reliability change point, and an ND map update process (S490) is started.

In a case where the fourth condition is satisfied (Yes in S430), the evaluation unit 430 determines whether or not the fifth condition is satisfied for the same point (S440). In a case where the fifth condition is not satisfied (No in S440), the point is not extracted as the high-reliability change point, and the ND map update process (S490) is started.

In a case where the fifth condition is satisfied (Yes in S440), the evaluation unit 430 determines whether or not the sixth condition is satisfied for the same point (S450). In a case in which the sixth condition is not satisfied (No in S450), the point is not extracted as the high-reliability change point, and the ND map update process (S490) is started.

In a case where the sixth condition is satisfied (Yes in S450), the change point extraction unit 440 extracts the point as the high-reliability change point (S460). Then, the maintenance-required point registration unit 450 registers the extracted point as a maintenance-required point in the database (S470). In addition, the flag giving unit 460 determines that the non-recommendation flag needs to be given to the voxel corresponding to the high-reliability change point extracted by the change point extraction unit 440 in the ND map (S480). Then, the server 40 performs the ND map update process (S490).

Figure 20:
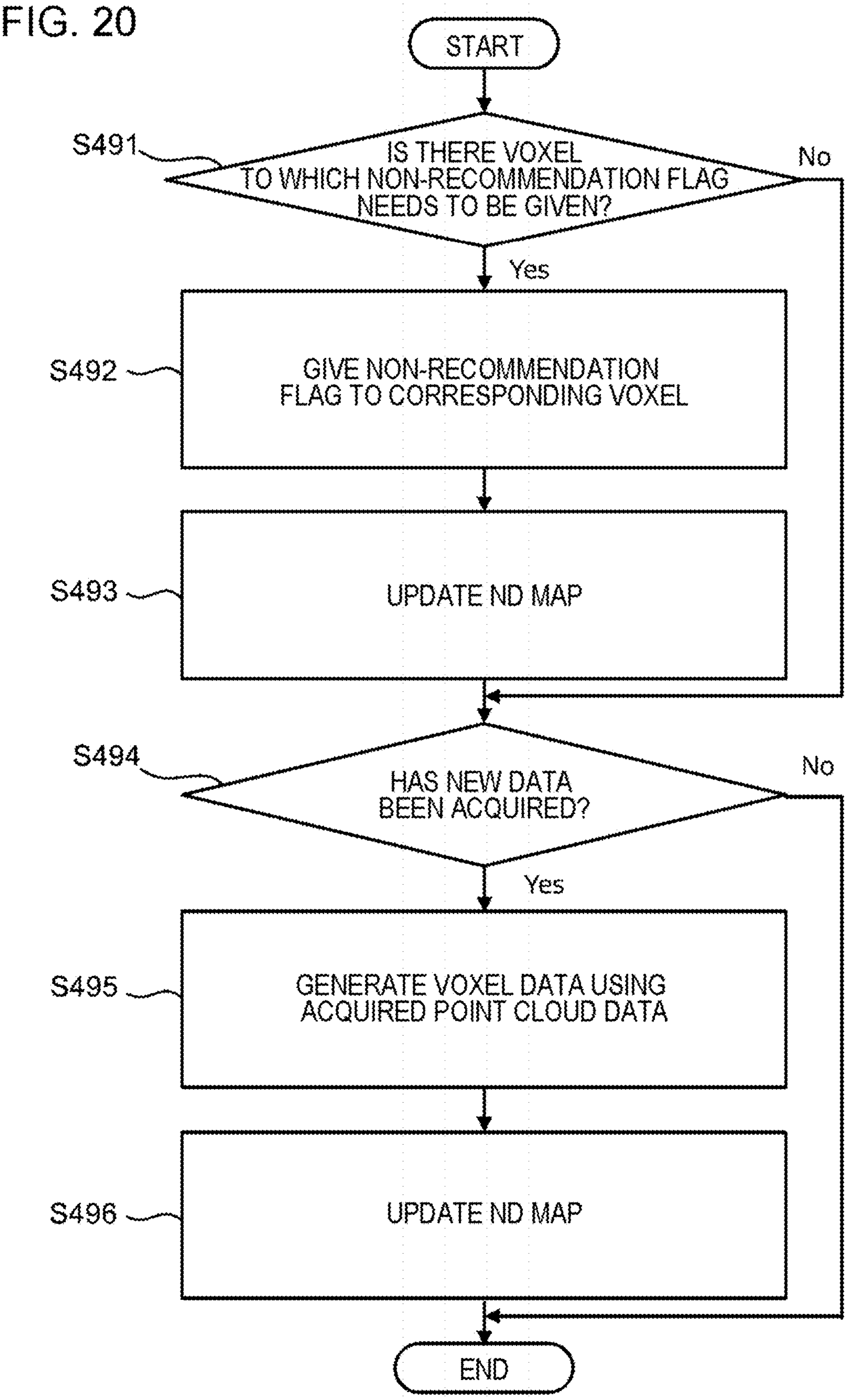
FIG. 20 is a flowchart illustrating a flow of an ND map update process performed by the server according to Example 1.

FIG. 20 is a flowchart illustrating a flow of the ND map update process performed by the server 40 according to the present example. In a case in which the ND map update process is started, it is determined whether or not there is a voxel to which the non-recommendation flag needs to be given (S491). In a case where it is determined in S480 that the non-recommendation flag needs to be given, it is determined that there is a voxel to which the non-recommendation flag needs to be given (Yes in S491). Then, the flag giving unit 460 reads out the ND map stored in the storage unit 470 and gives the non-recommendation flag to the corresponding voxel (S492). Then, the flag giving unit 460 updates the ND map stored in the storage unit 470 (S493). Then, the process proceeds to S494. On the other hand, in a case in which S480 is not performed and it is determined that there is no voxel to which the non-recommendation flag needs to be given (No in S491), S492 and S493 are not performed, and the process proceeds to S494.

In S494, it is determined whether or not new point cloud data for updating the ND map has been acquired. For example, in a case where the new point cloud data has been obtained by a measurement and maintenance vehicle or the like, the data is stored in the storage unit 470. Therefore, it is possible to determine whether or not the new point cloud data has been acquired on the basis of whether or not new data has been stored in the storage unit 470. In a case in which the new data has been acquired (Yes in S494), the server 40 generates voxel data in the ND map, using the acquired point cloud data. Then, the non-recommendation flag of the newly generated voxel is cleared (S495). The flag giving unit 460 updates the ND map stored in the storage unit 470 (S496), and the ND map update process is ended. In a case in which the new data has not been acquired (No in S494), the new voxel data is not generated, and the ND map update process is ended.

The ND map stored in the storage unit 470 is acquired by the estimation apparatus 10 and is used for the self-position estimation of the moving body 20.

In the present example, the example has been described in which the estimation apparatus 10 identifies the estimated change point and transmits the information of the estimated change point to the server 40. However, the distribution of the processes between the estimation apparatus 10 and the server 40 is not particularly limited. For example, the point cloud data obtained by the sensor 210 of the moving body 20 and the movement information of the moving body 20 may be transmitted from the estimation apparatus 10 to the server 40, and the server 40 may identify the estimated change point. In this case, the server 40 also functions as the estimation apparatus 10. In addition, the estimation apparatus 10 may perform the change point detection process up to any stage, necessary information may be transmitted from the estimation apparatus 10 to the server 40, and the server 40 may perform the remaining process.

In the present example, the example has been described in which the change point detection process is performed in combination with the self-position estimation by the self-position estimation unit 140. However, the change point detection process may be performed after the self-position estimation process separately from the self-position estimation process. In this case, the first acquisition unit 110 may read out the point cloud data that has been acquired by the sensor 210 in advance and stored in the storage unit to acquire the point cloud data. In addition, information indicating the velocity or the like of the moving body 20 for each time may be stored in the storage unit once, and the estimation apparatus 10 may read and use the information.

As described above, according to the present example, the same operation and effect as those of the embodiment can be obtained.

Example 2

FIG. 21 is a flowchart illustrating a flow of a change point detection process performed by an estimation apparatus 10 according to Example 2. The estimation apparatus 10 according to the present example is the same as the estimation apparatus 10 according to Example 1 except for the points described below. In the present example, the estimation unit 190 calculates the strength of the correlation between the ratio value of the first region after shifting and the ratio value of the second region for a plurality of shift amounts and identifies a shift amount at which the strength of the correlation has a maximum value. Then, the estimation unit 190 compares the identified shift amount with a reference value to identify the estimated change point. Here, the reference value is determined on the basis of the distance between the first region and the second region.

The estimation unit 190 according to the present example identifies the estimated change point using a cross-correlation function instead of using the first index and the second index described in Example 1. In the estimation apparatus 10 according to the present example, when the change point detection process is started, the division unit 150 divides the point cloud data into data of a plurality of regions, as in S801 described in Example 1. Then, the ratio value calculation unit 170 calculates the DDAR of each region (S811). In addition, the ratio value calculation unit 170 performs the filtering process and the normalization on the DDAR.

Then, in S182, the shift unit 191 calculates the cross-correlation function between the DDAR of the first region and the DDAR of the second region. The shift unit 191 may or may not invert the DDAR of the first region and the DDAR of the second region before calculating the cross-correlation function. Specifically, the shift unit 191 calculates a cross-correlation function C(τ) using Expression (7). Here, f(t) is the DDAR of the first region, g(t) is the DDAR of the second region, and τ is a time shift amount. In addition, the time shift amount τ can be multiplied by the velocity v of the moving body 20 to be converted into a position shift amount D. The shift unit 191 can acquire the velocity v at the timing (for example, the time) when the point cloud data that is the basis for the DDAR was obtained from the velocity sensor provided in the moving body 20.

[Equation 4]

$$C(\tau) = \sum_t f(t)g(t-\tau) \tag{7}$$

Figure 22:
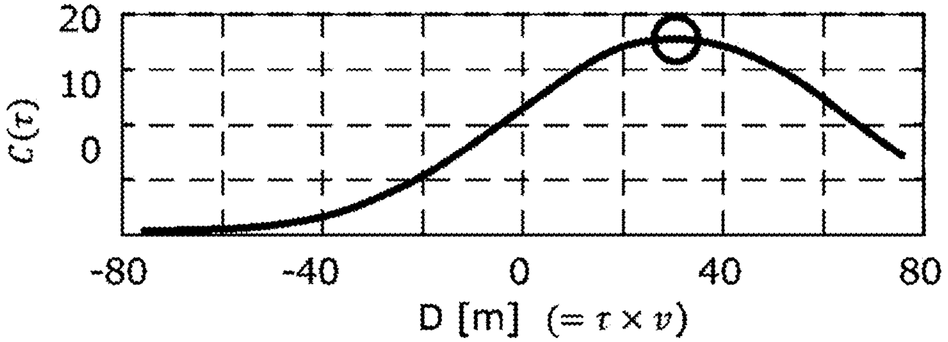
FIG. 22 is a graph illustrating a cross-correlation function C (t).

FIG. 22 is a graph illustrating the cross-correlation function C(τ). In this figure, a high correlation value is obtained at a point represented by a circle. When the shift amount at this time is appropriate on the basis of the region interval between the first region and the second region, it can be determined as the result by the change point.

Returning to FIG. 21, in a case in which the cross-correlation function is calculated, in the subsequent S813, the correlation determination unit 192 identifies a maximum correlation value Cmax in the cross-correlation function and further identifies a shift amount at the time when the correlation value is the maximum correlation value $C_{max}$. Then, in S814, the correlation determination unit 192 determines whether or not a seventh condition and an eighth condition which will be described below are satisfied.

The seventh condition is that the maximum correlation value $C_{max}$ is greater than a threshold value Th5. In addition, the eighth condition is that the following |(D−L)/L| is less than a threshold value Th6. Here, D is the above-described position shift amount D, and L is the region interval between the first region and the second region. The seventh condition indicates that the magnitude of the correlation is large enough to estimate the presence of the change point. The eighth condition indicates that the deviation between the characteristics of the DDAR of the first region and the DDAR of the second region is appropriate on the basis of the actual positional relationship between the regions. The region interval L between the first region and the second region is predetermined.

In a case where at least one of the seventh condition and the eighth condition is not satisfied (No in S814), the change point detection process is ended. On the other hand, in a case where both the seventh condition and the eighth condition are satisfied (Yes in S814), the change point identification unit 193 identifies the position of the estimated change point. In addition, the reliability calculation unit 180 calculates the reliability $R_{cp}$ of the estimated change point (S815). The change point identification unit 193 identifies the peak timing of the DDAR of the first region or the second region. Then, the change point identification unit 193 can identify, as the position of the estimated change point, a position in the direction of the region from the moving body 20 on the basis of the estimated self-position of the moving body 20 at that timing.

The reliability calculation unit 180 can calculate the reliability $R_{cp}$ using the maximum correlation value $C_{max}$ and the value of |(D−L)/L|. Specifically, the reliability calculation unit 180 calculates the reliability $R_{cp}$ according to a relationship of the following Expressions (8) to (10). Here, d and e are predetermined coefficients. d is, for example, equal to or greater than 0.1 and equal to or less than 1.0, and e is, for example, equal to or greater than 5.0 and equal to or less than 10.0. That is, the reliability calculation unit 180 increases the reliability $R_{cp}$ as the maximum correlation value $C_{max}$ increases and increases the reliability $R_{cp}$ as the value of |(D−L)/L| decreases. Both of $R_{cp4}$ and $R_{cp5}$ which are calculation results of Expression (8) and Expression (9), respectively, are values in a range of 0 to 1. Therefore, as both of $R_{cp4}$ and $R_{cp5}$ are larger, the reliability $R_{cp}$ is also larger and is closer to 1. In addition, when any one of $R_{cp4}$ and $R_{cp5}$ is close to 0, the reliability $R_{cp}$ is small.

[Equation 5]

$$R_{cp4} = 1 - \exp(-d \times C_{max}) \tag{8}$$

$$R_{cp5} = \exp\left(-e \times \left|\frac{D-L}{L}\right|\right) \tag{9}$$

$$R_{cp} = R_{cp4} \times R_{cp5} \tag{10}$$

Then, in S816, information indicating the position, detection time, and reliability of the estimated change point is transmitted from the estimation apparatus 10 to the server 40. Then, the change point detection process is ended.

The method according to the present example also makes it possible to estimate the change point with high accuracy.

As described above, according to the present example, the same operation and effect as those of the embodiment can be obtained.

Hereinafter, the embodiments and the examples will be described with reference to experimental examples. In addition, the embodiments and the examples are not limited to the description of these experimental examples.

Experimental Example 1

In order to confirm the effect of the change point detection according to Example 1, voxel data of a certain building was deleted from the ND map to generate an ND map that was not matched with the actual environment.

Figure 23:
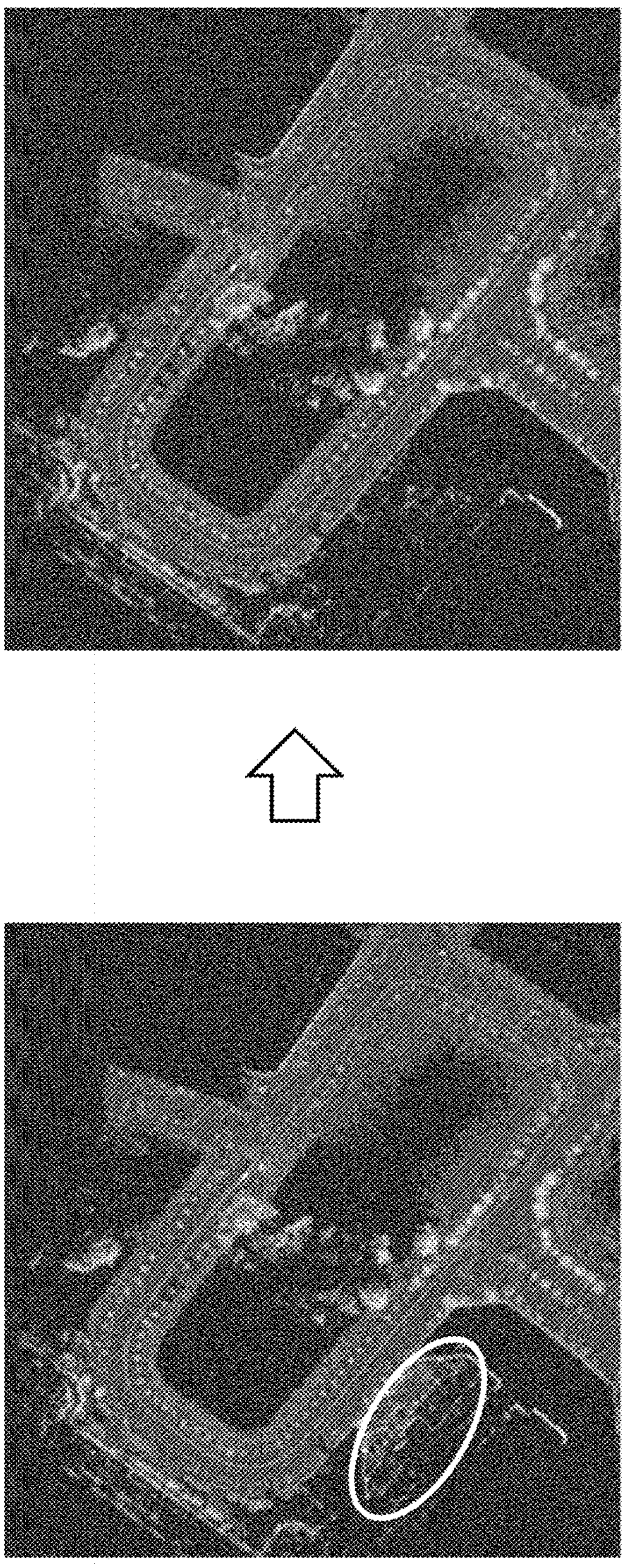
FIG. 23 is a diagram illustrating an original ND map and an ND map in which a change point has been generated.

FIG. 23 is a diagram illustrating the original ND map and an ND map in which the change point has been generated. The Information of the building present in a region surrounded by a white ellipse in the original ND map was deleted. In practice, since the building is present, data obtained by measuring the building is acquired. However, since the voxel data of the building is not present in the ND map, the association ratio is reduced. This situation is equivalent to a situation in which a new building has been constructed, but has not been reflected in the ND map.

FIGS. 24A to 24K are diagrams illustrating various types of data obtained by a vehicle traveling counterclockwise along a course around a road illustrated in FIG. 23. Each of FIGS. 24A to 24D is a graph illustrating a difference value from the estimated self-position which is a result of performing NDT scan matching using the position and orientation of the vehicle obtained by a real time kinematic global positioning system (RTK-GPS) as a reference for evaluation. As can be seen from these results, the voxel data of the building is deleted in the ND map, but the accuracy of the self-position estimation hardly deteriorates.

Figures 24A, 24B, 24C, 24D, 24E, 24F, 24G, 24H, 24I, 24J, 24K:
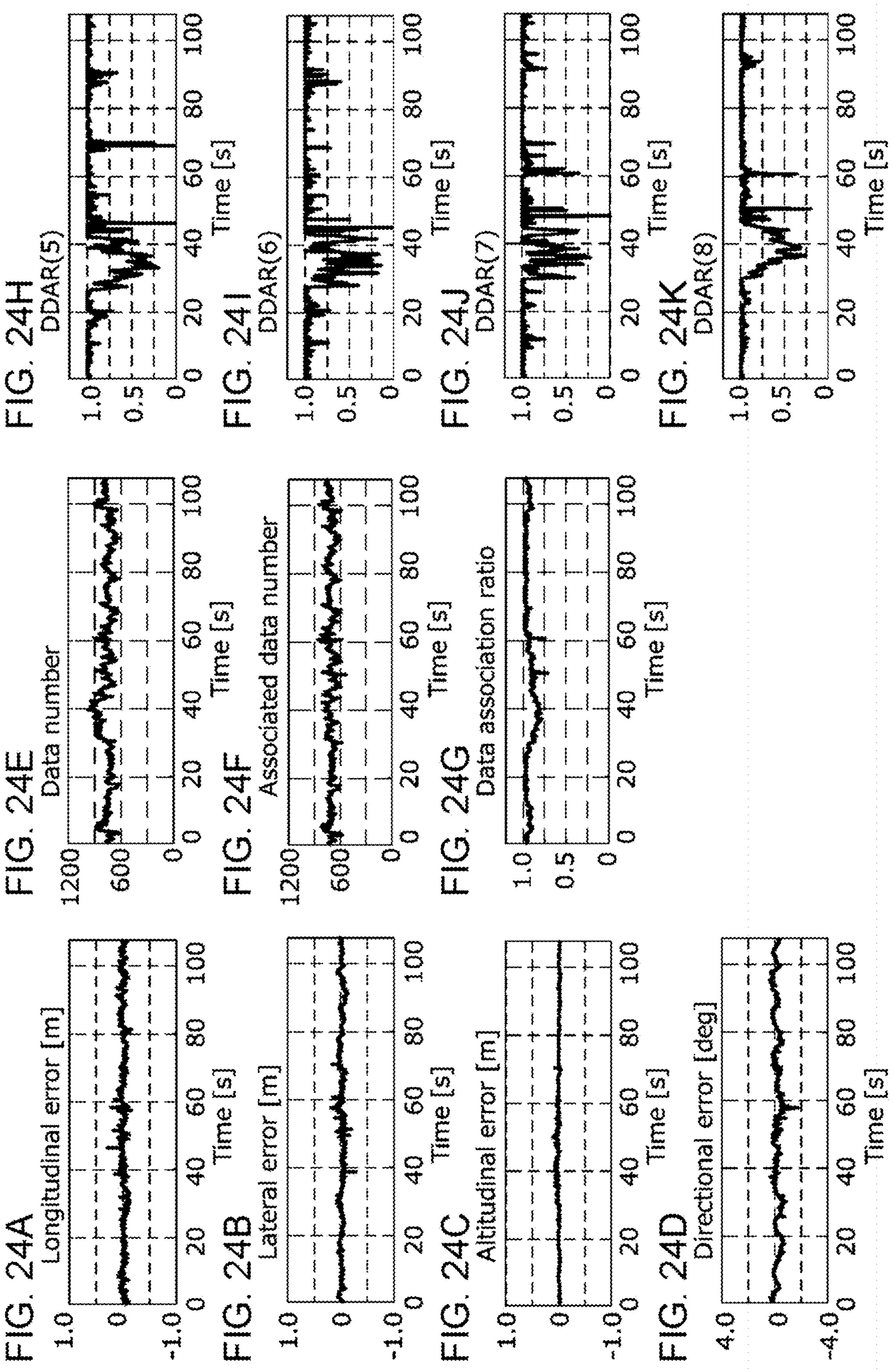
FIGS. 24A to 24K are diagrams illustrating various types of data obtained by a vehicle traveling along a course illustrated in FIG. 23.

FIGS. 24E to 24G illustrate the number of all data points after the downsampling of the point cloud data generated by the LiDAR mounted on the vehicle, the number of data points associated with the voxels of the ND map, and the overall ratio value DAR. It can be seen that the DAR is slightly reduced in a portion of 30 to 50 [s].

Figure 25:
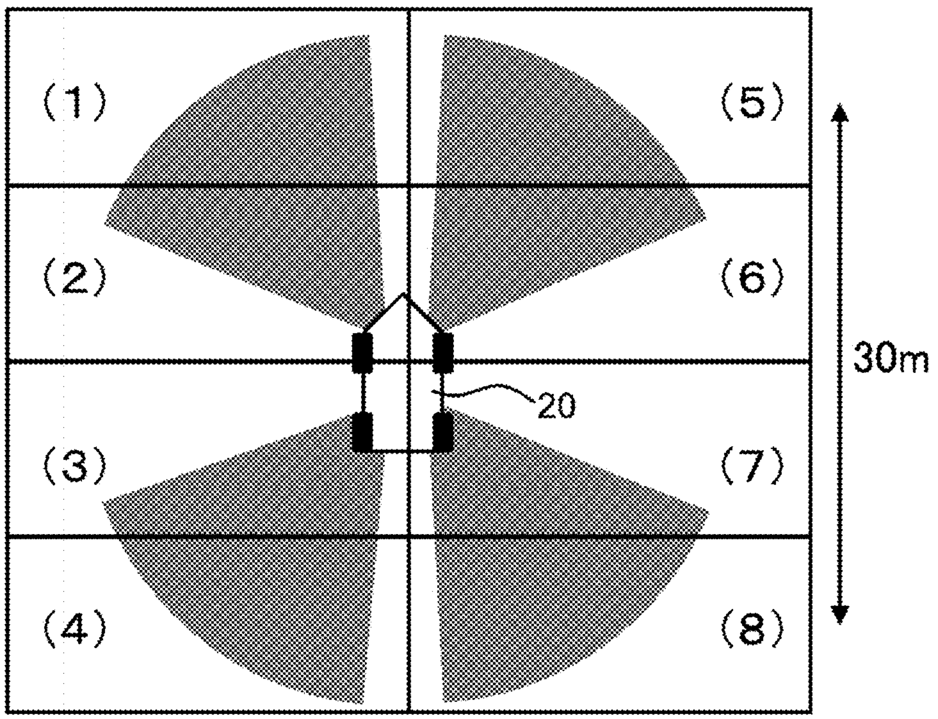
FIG. 25 is a diagram illustrating a relationship between a moving body (vehicle) and regions (1) to (8) in Experimental Example 1.

FIG. 25 is a diagram illustrating a relationship between the moving body 20 (vehicle) and the regions (1) to (8) in the present experimental example. Each of FIGS. 24H to 24K illustrates the DDAR of each region on the right side as viewed from the vehicle. It can be seen that a portion in which the value is reduced is gradually moving.

Figure 26A:
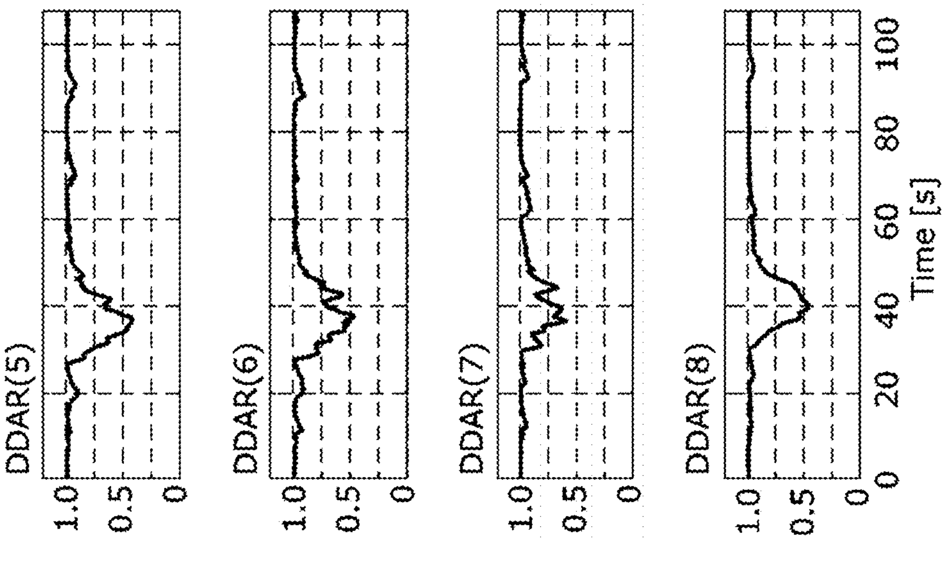
FIGS. 26A to 26C are diagrams illustrating results of performing a filtering process, a normalization process, and a limit process described in Example 1 on each DDAR, respectively.
Figure 26B:
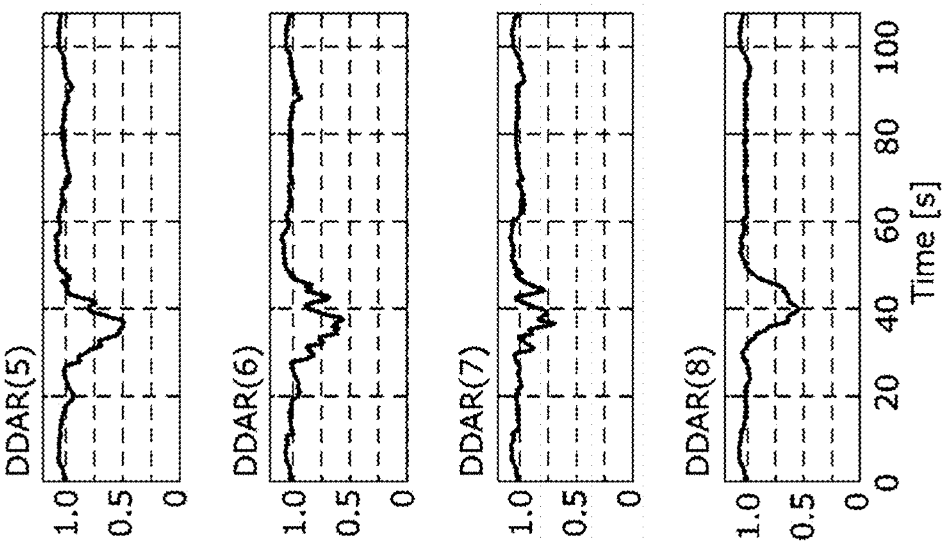
Figure 26C:
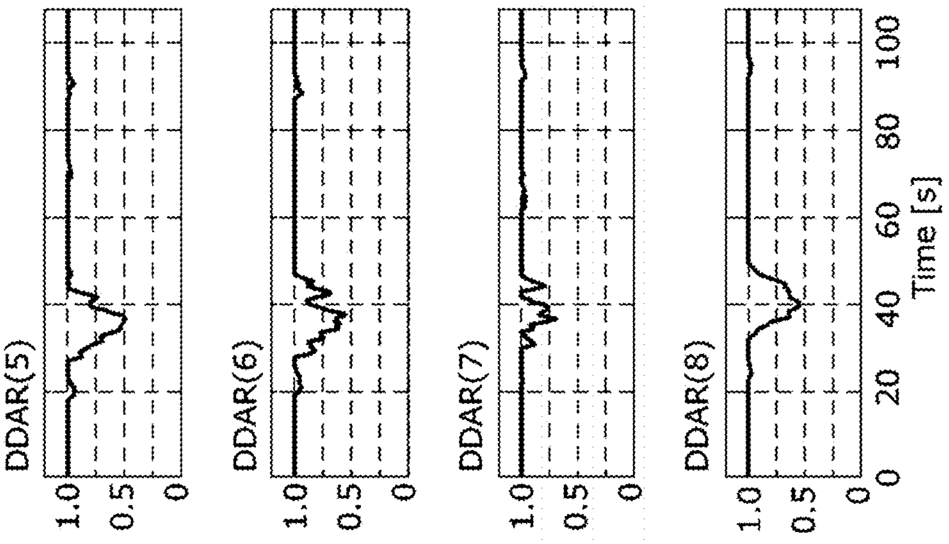

FIGS. 26A to 26C are diagrams illustrating the results of performing the filtering process, the normalization process, and the limit process described in Example 1 on each DDAR, respectively. That is, FIG. 26A illustrates data obtained by performing the filtering process on each of FIG. 24H to FIG. 24K, FIG. 26B illustrates data obtained by performing the normalization process on each data item of FIG. 26A, and FIG. 26C illustrates data obtained by performing the limit process on each data item of FIG. 26B. It can be seen that the contrast of a portion in which the DDAR is reduced due to the difference between the point cloud data and the voxel data is relatively enhanced by these processes. The subsequent process was performed using DDAR(5) and DDAR(8) having a large number of data points and a clear change characteristic among the DDARs.

Figure 27A:
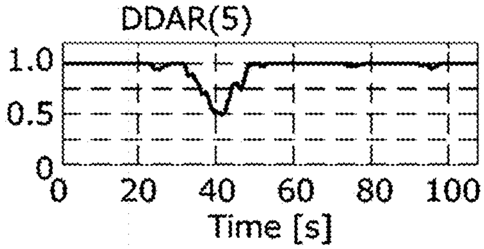
FIGS. 27A to 27E are diagrams illustrating each data item during the change point detection process.
Figure 27B:
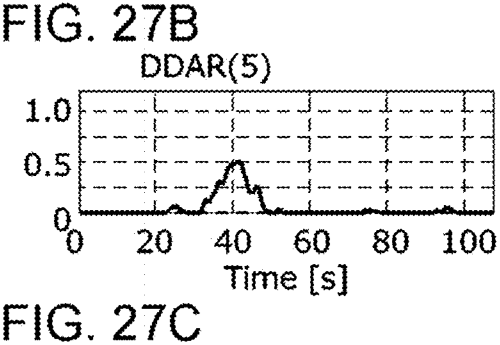
Figure 27C:
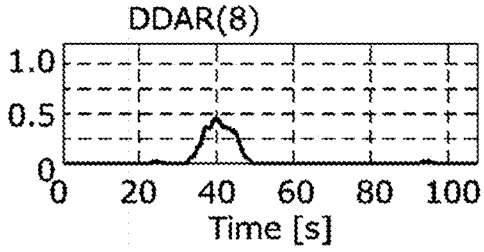
Figure 27D:
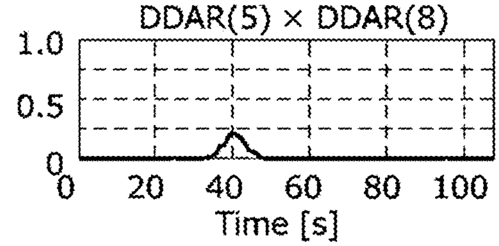
Figure 27E:
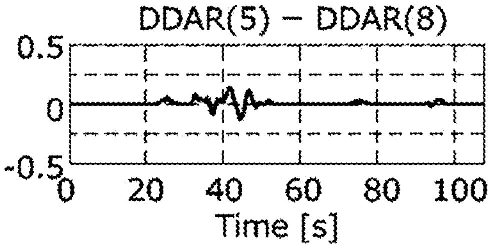

FIGS. 27A to 27E are diagrams illustrating each data item during the change point detection process. FIG. 27A is a graph obtained by shifting the time axis of DDAR(5) of FIG. 26C on the basis of the velocity of the vehicle and the region interval (30 m). FIG. 27B is a graph obtained by inverting the graph of FIG. 27A. FIG. 27C is a graph obtained by inverting the graph of DDAR(8) of FIG. 26C. FIGS. 27D and 27E are graphs illustrating the first index M and the second index S calculated using the data illustrated in FIGS. 27B and 27C, respectively.

$W_t$ calculated on the basis of the first index M was 10.792 [s], and $W_d$ was 66.714 [m]. Further, the threshold value Th1 was set to 0.04. In addition, N was 131, and $M_{ave}$ was calculated to be 0.128. Furthermore, $S_{dev}$ calculated on the basis of the second index S was 0.071. When the determination was performed setting the threshold value Th2 to 5.0, the threshold value Th3 to 0.05, and the threshold value Th4 to 0.2, all of the conditions of $W_d \geq$Th2, $M_{ave} \geq$Th3, and $S_{dev} \leq$Th4 were satisfied, and the change point was estimated as a result. In addition, the reliability $R_{cp}$ was calculated using the calculated $W_d$, $M_{ave}$, and $S_{dev}$. The results of $R_{cp}1=0.999$, $R_{cp}2=0.923$, $R_{cp}3=0.931$, and $R_{cp}=0.858$ were obtained. Further, a=0.1, b=20.0, and c=1.0 were set. $R_{cp}=0.858$ is a value close to 1, and it can be said that the result is high as the change point reliability. In addition, each of the values of the threshold value Th1, the threshold value Th2, the threshold value Th3, the threshold value Th4, the coefficient a, the coefficient b, and the coefficient c was set from the results of the examinations by a plurality of experiments.

Figure 28:
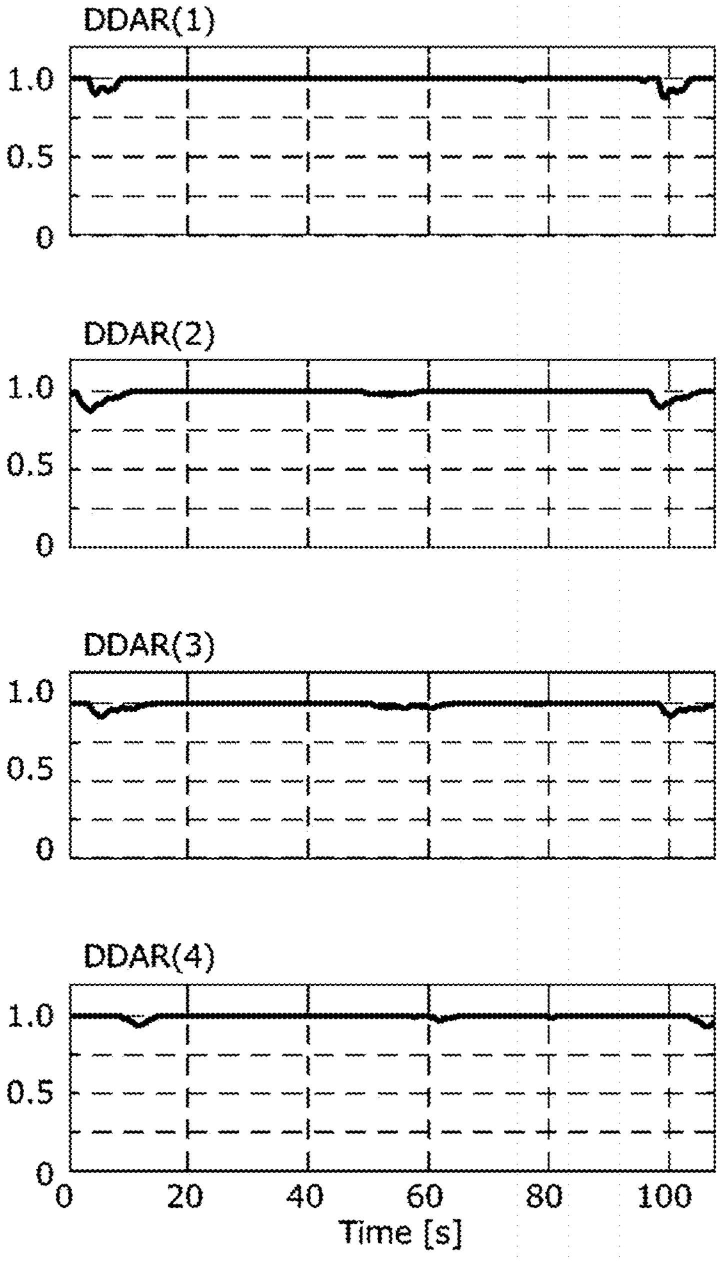
FIG. 28 is a diagram illustrating the DDAR of each region on the left side as viewed from the vehicle.

FIG. 28 is a diagram illustrating the DDAR of each region on the left side as viewed from the vehicle. All of the diagrams illustrate data after the filtering process, the normalization process, and the limit process are performed. The regions on the left side as viewed from the vehicle were also examined using these data items. Since the actual environment and the ND map are matched with each other on the left side, the association ratios of the regions (1) to (4) are high.

Figure 29A:
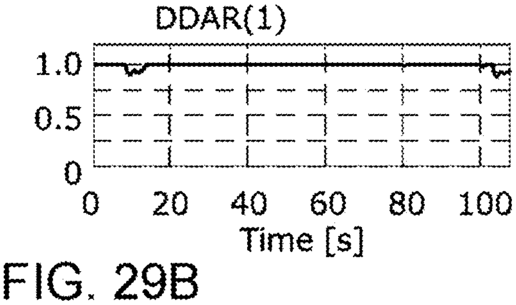
FIGS. 29A to 29E are diagrams illustrating each data item during the change point detection process.
Figure 29B:
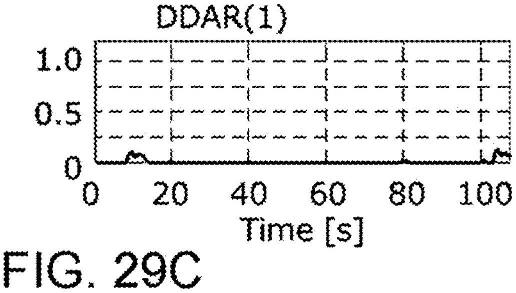
Figure 29C:
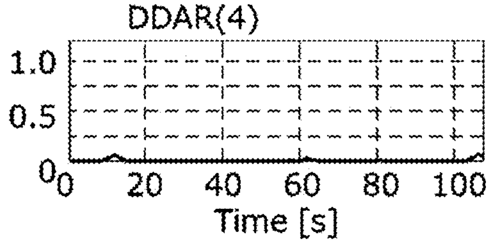
Figure 29D:
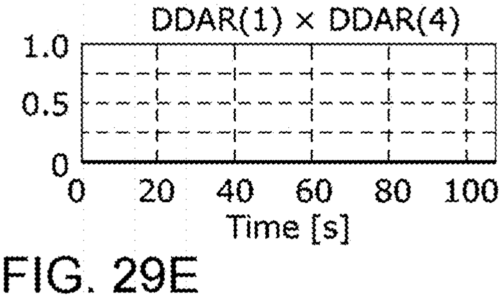
Figure 29E:
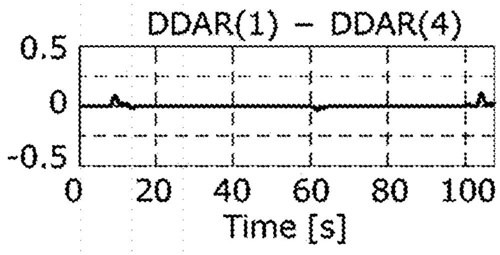

FIGS. 29A to 29E are diagrams illustrating each data item during the change point detection process. FIG. 29A is a graph in which the time axis of DDAR(1) of FIG. 28 is shifted on the basis of the velocity of the vehicle and the region interval (30 m). FIG. 29B is a graph obtained by inverting the graph of FIG. 29A. FIG. 29C is a graph obtained by inverting the graph of DDAR(4) of FIG. 28. FIGS. 29D and 29E are graphs illustrating the first index M and the second index S calculated by using the data illustrated in FIGS. 29B and 29C, respectively.

As a result, the first index M was almost zero over the entire range, and there was no portion in which the first index M was greater than the threshold value Th1. Therefore, the change point was not detected as a result.

As described above, it was confirmed that the change point could be detected by using the method according to Example 1.

Experimental Example 2

The change point detection process according to Example 2 was performed using the same ND map and point cloud data as those in Experimental Example 1.

Figure 30:
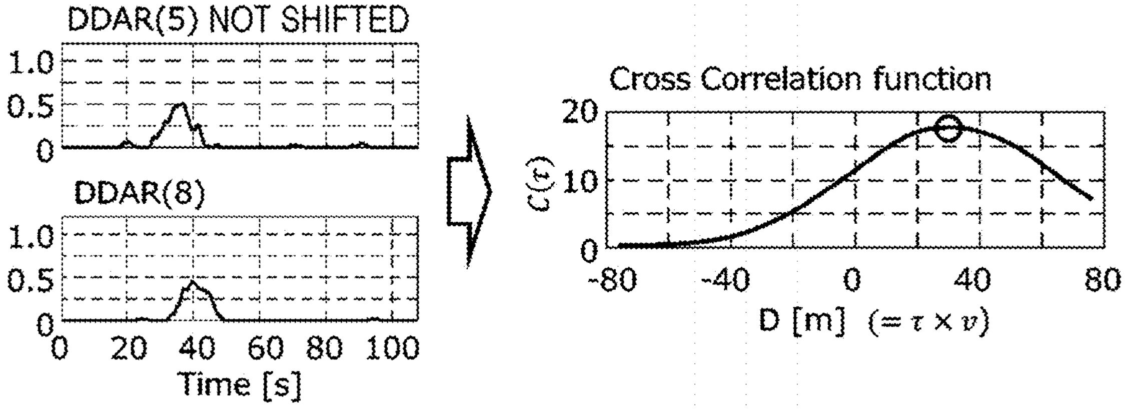
FIG. 30 is a diagram illustrating a cross-correlation function C (t) calculated using DDAR(5) and DDAR(8) illustrated in FIG. 26C.

FIG. 30 is a diagram illustrating a cross-correlation function C (t) calculated using DDAR(5) and DDAR(8) illustrated in FIG. 26C. FIG. 30 illustrates DDAR(5) and DDAR (8) together after being inverted. In the cross-correlation function C(τ) illustrated in FIG. 30, the maximum correlation value $C_{max}$ is represented by a circle. In the result illustrated in FIG. 30, $C_{max}$ was 17.758 when D was 30.505 [m]. The region interval L between the region (5) and the region (8) was 30 m, and $|(D-L)/L|$ was calculated to be 0.0168. When the determination was performed setting the threshold value Th5 to 10.0 and Th6 to 0.2, both $C_{max}$>Th5 and |(D−L)/L|≤Th6 were satisfied, and the change point was detected as a result.

In addition, the reliability $R_{cp}$ was calculated using the calculated $C_{max}$ and |(D−L)/L|. The results of $R_{cp4}$=0.999, $R_{cp5}$=0.874, and $R_{cp}$=0.873 were obtained. In addition, d=0.4 and e=8.0 were set. $R_{cp}$=0.873 is a value close to 1, and it can be said that the result is high as the change point reliability. In addition, each of the values of the threshold value Th5, the threshold value Th6, the coefficient d, and the coefficient e was set from the results of the examinations by a plurality of experiments.

Figure 31:
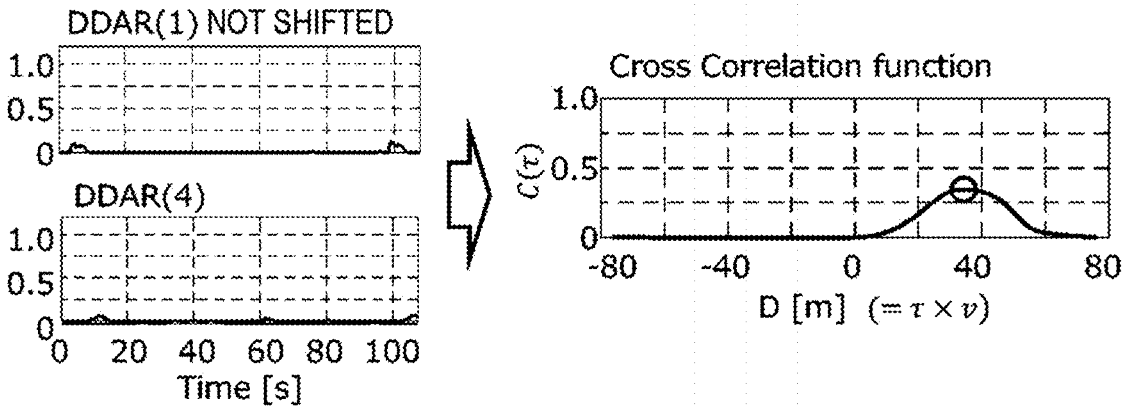
FIG. 31 is a diagram illustrating a cross-correlation function C (t) calculated using DDAR(1) and DDAR(4) illustrated in FIG. 28.

FIG. 31 is a diagram illustrating the cross-correlation function C(τ) calculated using DDAR(1) and DDAR(4) illustrated in FIG. 28. This figure illustrates DDAR(1) and DDAR(4) together after being inverted. In the cross-correlation function C(τ) illustrated in FIG. 31, the maximum correlation value $C_{max}$ is represented by a circle. In the result illustrated in this figure, $C_{max}$ was 0.347 when D was 34.572 [m]. The region interval L between the region (1) and the region (4) was 30 m, and |(D−L)/L| was calculated to be 0.1524. When the determination was performed setting the threshold value Th5 to 10.0 and Th6 to 0.2, |(D−L)/L|≤Th6 was satisfied, but $C_{max}$≥Th5 was not satisfied. Therefore, the change point was not detected as a result.

As described above, it was confirmed that the change point could be detected by using the method according to Example 2.

The embodiments and the examples have been described above with reference to the drawings. However, these are examples of the present invention, and various configurations other than the above can also be adopted.

This application claims priority based on Japanese Patent Application No. 2022-038992 filed on Mar. 14, 2022, the disclosure of which is incorporated herein by reference.

REFERENCE SIGNS LIST

10 estimation apparatus
20 moving body
40 server
50 system
110 first acquisition unit
130 second acquisition unit
140 self-position estimation unit
150 division unit
170 ratio value calculation unit
180 reliability calculation unit
190 estimation unit
410 change point information acquisition unit
420 information development unit
430 evaluation unit
440 change point extraction unit
450 maintenance-required point registration unit
460 flag giving unit
470 storage unit
1000 computer

The invention claimed is:

1. An estimation apparatus comprising:
at least one memory configured to store instructions; and
at least one processor configured to execute the instructions to perform operations comprising:
acquiring point cloud data at a plurality of timings obtained by a sensor mounted on a moving body;
acquiring map information;
dividing each acquired point cloud data item into a plurality of predetermined regions;
calculating, for at least two regions of the plurality of predetermined regions, a ratio value indicating an association ratio between each data point and the map information in each region;
identifying an estimated change point where a content of the map information is estimated to be different from an actual situation, based on the ratio value for the at least two regions; and
adjusting handling of map data corresponding to the identified estimated change point for self-position estimation of the moving body.

2. The estimation apparatus according to claim 1,
wherein the at least two regions includes a first region and a second region different from the first region, and
wherein calculating the ratio value for the least two regions comprises calculating time-series ratio values of the first region and the second region.

3. The estimation apparatus according to claim 2,
wherein identifying the estimated change point comprises identifying the estimated change point using a strength of correlation between a post-shift ratio value obtained by shifting a time or position of the ratio value of the first region and the ratio value of the second region.

4. The estimation apparatus according to claim 3,
wherein identifying the estimated change point comprises identifying the estimated change point using the post-shift ratio value obtained by shifting a time axis of the ratio value of the first region by a time τ so as to be matched with a time axis of the ratio value of the second region, and the ratio value of the second region.

5. The estimation apparatus according to claim 4,
wherein the time τ is calculated using a velocity of the moving body.

6. The estimation apparatus according to claim 3,
wherein identifying the estimated change point comprises calculating a first index by multiplying the post-shift ratio value by the ratio value of the second region, calculating a second index by subtracting one of the post-shift ratio value of the first region and the ratio value of the second region from an other, and identifying the estimated change point using the first index and the second index.

7. A system comprising:
the estimation apparatus according to claim 6; and
a server,
wherein the estimation apparatus:
calculates a reliability based on the first index and the second index;
associates a time when the estimated change point was identified and the reliability with information indicating the identified estimated change point; and
transmits the information indicating the estimated change point to the server, and
wherein the server:
receives information indicating a plurality of the estimated change points;
processes the received information indicating the plurality of estimated change points for each point to extract an estimated change point where the content of the map information is highly likely to be different from the actual situation from among the plurality of estimated change points; and
setting a non-recommendation flag on a voxel corresponding to the extracted estimated change point.

8. The estimation apparatus according to claim 1,
wherein identifying the estimated change point comprises calculating a strength of correlation for a plurality of shift amounts, identifying a shift amount at which the strength of the correlation has a maximum value, and identifying the estimated change point by comparing the identified shift amount with a reference value.

9. The estimation apparatus according to claim 8, wherein the reference value is determined on a basis of a distance between a first region of the at least two regions and a second region of the at least two regions.

10. The estimation apparatus according to claim 1, wherein the operations further comprise calculating an overall ratio value indicating an association ratio between each data point of the point cloud data before the dividing and the map information and normalizing the ratio value of a first region of the at least two regions and the ratio value of a second region of the at least two regions with the overall ratio value, and identifying the estimated change point comprises identifying the estimated change point using the normalized ratio values.

11. The estimation apparatus according to claim 1, wherein the map information is data that is usable as reference data for normal distributions transform (NDT) scan matching.

12. The estimation apparatus according to claim 11, wherein the estimation apparatus further calculates a reliability related to the estimated change point and transmits the reliability to a server, and the server extracts the estimated change point where the content of the map information is highly likely to be different from the actual situation from among the plurality of estimated change points, further using a received reliability.

13. A system comprising:

the estimation apparatus according to claim 1; and a server, wherein the estimation apparatus transmits information indicating the identified estimated change point to the server, and the server receives information indicating a plurality of the estimated change points and processes the received information indicating the plurality of estimated change points for each point to extract the estimated change point where the content of the map information is highly likely to be different from the actual situation from among the plurality of estimated change points.

14. The estimation apparatus according to claim 1, wherein adjusting handling of map data comprises setting a non-recommendation flag on a voxel corresponding to the identified estimated change point such that the voxel is not used for normal distributions transform (NDT) scan matching.

15. The estimation apparatus according to claim 1, wherein adjusting handling of map data comprises reducing a weight of a voxel corresponding to the identified estimated change point, the weight indicating a magnitude of influence of information of the voxel on calculation of the self-position estimation.

16. The estimation apparatus according to claim 1, wherein the operations further comprise performing normal distributions transform (NDT) scan matching, using the map information and the point cloud data to calculate an estimated self-position of the moving body.

17. The estimation apparatus according to claim 1, wherein the operations further comprise outputting the self-position estimation of the moving body for use in at least one of navigation, autonomous driving, and driving assistance.

18. An estimation method executed by a computer, the estimation method comprising:

acquiring point cloud data at a plurality of timings obtained by a sensor mounted on a moving body;

acquiring map information;

dividing each acquired point cloud data item into a plurality of predetermined regions;

calculating, for at least two regions of the plurality of predetermined regions, a ratio value indicating an association ratio between each data point and the map information in each region;

identifying an estimated change point where a content of the map information is estimated to be different from an actual situation, based on the ratio value for the at least two regions; and adjusting handling of map data corresponding to the identified estimated change point for self-position estimation of the moving body.

19. A non-transitory storage medium storing a program causing a computer to execute the estimation method according to claim 18.

* * * * *